(12) United States Patent
Cloth

(10) Patent No.: US 7,040,580 B1
(45) Date of Patent: May 9, 2006

(54) AUTOMATIC ACTIVATION DEVICE FOR DEPLOYING A PARACHUTE AND METHODS THEREOF

(76) Inventor: Helmut Cloth, Sporckweg 9, 33104, Paderborn (DE)

( * ) Notice: Subject to any disclaimer, the term of this patent is extended or adjusted under 35 U.S.C. 154(b) by 0 days.

(21) Appl. No.: 10/963,816

(22) Filed: Oct. 14, 2004

Related U.S. Application Data

(60) Provisional application No. 60/510,515, filed on Oct. 14, 2003, provisional application No. 60/617,027, filed on Oct. 12, 2004.

(51) Int. Cl.
*B64D 17/56* (2006.01)

(52) U.S. Cl. ........................ 244/149; 244/152

(58) Field of Classification Search ........ 244/147–152; 277/312; 137/199
See application file for complete search history.

(56) References Cited

U.S. PATENT DOCUMENTS

| | | | | |
|---|---|---|---|---|
| 2,593,432 A | * | 4/1952 | Freas | 455/96 |
| 3,033,911 A | * | 5/1962 | Duddy | 429/86 |
| 3,906,798 A | * | 9/1975 | Dray | 73/384 |
| 4,071,040 A | * | 1/1978 | Moriarty | 137/199 |
| 4,227,663 A | * | 10/1980 | Ramsey et al. | 244/149 |
| 4,448,374 A | * | 5/1984 | Duncan | 244/150 |
| 5,215,312 A | * | 6/1993 | Knappe et al. | 277/312 |
| 5,828,012 A | * | 10/1998 | Repolle et al. | 181/175 |

* cited by examiner

*Primary Examiner*—Galen Barefoot
(74) *Attorney, Agent, or Firm*—Finnegan, Henderson, Farabow, Garrett & Dunner LLP

(57) ABSTRACT

Methods, systems, and computer program products for an automatic activation device for deploying a parachute are disclosed. The methods and systems include protecting the device from damage from a liquid and may include a filter configured to allow airflow to pass through the filter into the housing, while preventing passage of liquid through the filter into the housing. The methods, systems, and computer program products also include operating the automatic activation device for deploying a parachute and may include storing maintenance information in a memory of a processing unit that is related to a status of the device for deploying the parachute. The maintenance information may displayed to a user. The methods, systems, and computer program products may also include customizing an automatic activation device for deploying a parachute.

56 Claims, 20 Drawing Sheets

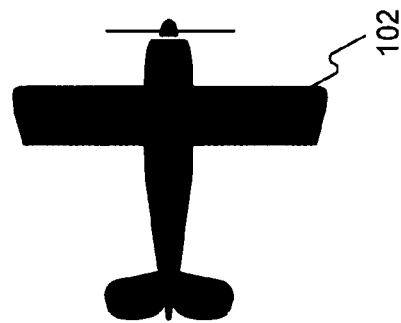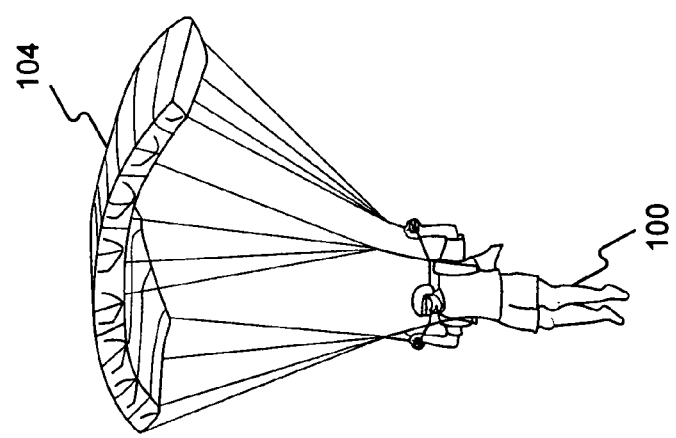
FIGURE 1

AUTOMATIC ACTIVATION DEVICE FOR DEPLOYING A PARACHUTE AND METHODS THEREOF

RELATED APPLICATIONS

This application claims the benefit of the filing date of U.S. Provisional Application No. 60/617,027, filed Oct. 12, 2004, titled "Improved Apparatus and Methods for an Automatic Activation Device for a Parachute in Parachuting Activities," to Helmut Cloth, and also claims the benefit of the filing date of U.S. Provisional Application No. 60/510,515, filed Oct. 14, 2003, both incorporated in their entirety herein by reference.

FIELD OF THE INVENTION

This disclosure is directed to the field of parachuting, and more particularly, to the field of automatic activation devices for automatically deploying a parachute.

BACKGROUND OF THE INVENTION

Parachuting is used by military personnel, wildfire-fighters, and others as a vital part of their profession. Still others parachute or skydive to provide entertainment, such as at sporting events or air shows.

Whatever the reason for parachuting, safety is a primary concern. In addition to a primary parachute, most parachutists equip themselves with a secondary, or reserve, parachute. If the primary parachute malfunctions, the parachutist deploys the reserve parachute in order to land safely. The primary parachute might malfunction, for example, if it fails to open or becomes tangled during flight.

However, the safety provided by a reserve parachute is only effective if the parachutist is capable of deploying the reserve parachute. If the parachutist is incapacitated, he may not be able to deploy the reserve parachute if his primary parachute fails. A parachutist may be incapacitated, for example, if he is knocked unconscious when exiting the airplane or if he collides with another parachutist.

To provide increased safety, parachutists may carry an automatic activation device (AAD) that may be used to automatically deploy the reserve parachute if necessary. One such AAD is the widely used CYPRES™ produced by Airtec GmbH and disclosed in U.S. Pat. Nos. 4,858,856 and 5,024,400, both of which are incorporated herein, in their entirety, by reference. An AAD may be installed into a parachutist's rig or equipment, and may be connected to the reserve parachute release mechanism. If a certain activating condition is met, e.g., the parachutist is in freefall below a predetermined altitude, the AAD will deploy the reserve parachute, enabling the parachutist to land safety.

While useful, currently available AADs may be improved to better meet the needs of parachutists. For example, a typical AAD can develop problems if it is exposed to water. Many parachutists land in or near water, so it is not uncommon for an AAD to get wet. For example, a parachutist may "pond swoop," or maneuver his parachute to skim the surface of a lake or pond before landing. In another example, a parachutist may use his parachute for intentional water landings, such as, for example when giving demonstrations or performances. In another example, a military pilot may need to eject from an airplane over the ocean. Additionally, a military parachutist, such as a paratrooper, may use his parachute for military jumps, over water, or in extreme weather situations, such as rainstorms. A typical AAD, once wet, should be professionally inspected and serviced before its next use in order to determine airworthiness. This may cause delay and expense for the parachutist, and in some cases, an AAD exposed to water may be rendered completely inoperable and should be replaced.

Another drawback of conventional AADs is the time, effort, and cost required to maintain the battery. An AAD with a completely drained battery may fail to open the reserve chute. Accordingly, the battery should be maintained and checked before use. To maintain a typical battery-powered AAD, a parachutist may monitor a great deal of maintenance information, including a battery replacement due date, the number of jumps made using the battery, and the battery voltage. In addition, some AADs require a professional installer to maintain and replace the battery. This maintenance of the battery may demand time, record keeping, and considerable attention to detail.

Still another shortcoming of conventional AADs is the amount of information a parachutist must monitor to maintain the AAD itself. An AAD may be serviced periodically, and parachutists must therefore monitor and record certain information, such as the AAD serial number and due date of the next AAD maintenance. AAD maintenance can take weeks or months, so if the parachutist has little or no advance notice of when maintenance is due, he may not be prepared to lose the use of his AAD for the time necessary. Conventional AADs may not provide easy access to the serial number nor ample notice of the next AAD maintenance due date.

It is therefore desirable to provide an automatic activation device that easily adapts to use after wet conditions, simplifies maintenance, and provides convenient information monitoring.

SUMMARY OF THE INVENTION

In one exemplary aspect, the invention is directed to a method of protecting an automatic activation device for deploying a parachute from damage from a liquid. The method may include securing a sensor in a housing of the automatic activation device and sealing the housing with at least one sealing material. A filter may be associated with the housing. The filter may be configured to allow airflow to pass through the filter into the housing and may be configured to prevent passage of liquid through the filter into the housing.

In another exemplary aspect, the sealing material is a sealing plug configured to seal about a communication cable associated with the housing. In another aspect, the sealing material is an O-ring associated with the housing. In yet another embodiment, the sealing material is a gasket associated with the housing. The filter may be removably secured to the housing, and may include threads for threading the filter onto the housing. The filter may be replaced after the automatic activation device contacts water. Also, the filter may be secured into a recess formed in the housing.

In another exemplary aspect, the filter is configured to prevent water from flowing through the filter for at least five minutes when submerged at a depth less than fifteen feet, and in another aspect, for at least fifteen minutes when submerged at a depth of about fifteen feet. The filter may be associated with the housing using a luer lock, and may be recessed in the housing. In another exemplary aspect, the invention is directed to a system for deploying the parachute.

In yet another exemplary aspect, the invention is directed to a method of deploying a parachute at a desired altitude with an automatic activation device. The method may include allowing air to flow through a filter to enter the automatic activation device so that an air pressure in the automatic activation device substantially corresponds to an air pressure outside the automatic activation device. The filter may be configured to prevent liquid from flowing through the filter and entering the automatic activation device. The method may also include monitoring the air pressure with a sensor disposed within the automatic activation device and may include triggering a release mechanism when the monitored air pressure substantially corresponds to an air pressure at the desired altitude to deploy the parachute.

In another aspect, the method includes calculating a rate of descent using the monitored air pressure and/or a height above ground level using the monitored air pressure. The method may also include advancing a blade to cut a closing loop and open a container containing the parachute.

In another aspect, the method may include communicating a signal representative of the monitored air pressure from the sensor to a processor and/or communicating a triggering signal from the processor to a release unit configured to deploy the parachute. In yet another aspect, the filter may be associated with a housing of the automatic activation device using a luer lock, and may be recessed a recess in the housing. In yet another embodiment, the invention is directed to a system for deploying a parachute.

In another exemplary aspect, the invention is directed to a method of operating an automatic activation device for deploying a parachute. The method may include storing maintenance information in a memory of a processing unit of the automatic activation device. The maintenance information may be related to a status of the device for deploying the parachute. The maintenance information may be accessed with a processor, and a display signal may be generated, indicative of the maintenance information. The maintenance information may be displayed on a display to an operator.

In another aspect, an operator input is received at the automatic activation device and the accessing step is performed based on the operator input. The maintenance information may include at least one of: a maintenance due date, an automatic maintenance reminder message, and an automatic maintenance due message.

In another aspect, the method may include activating the automatic activation device by an input device. The generating a display signal step may occur each time that the automatic activation device is activated by the input device. In one aspect, displaying the maintenance information on the display to the operator is performed for increasing lengths of time as a maintenance due date approaches, and the maintenance information displayed is varied depending on the status of the device.

In another exemplary aspect, the invention is directed to an automatic activation device for deploying a parachute including a processing unit in the automatic activation device having a processor and a memory. The processing unit may be configured to store maintenance information therein and generate a display signal indicative of the maintenance information. The maintenance information may be related to a status of the device for deploying the parachute. A display may be in communication with the processing unit. The display may be configured to receive the display signal from the processing unit, and may be configured to display the maintenance information on the display to an operator.

In another exemplary aspect, an input device may be configured to receive an operator input to activate the processing unit. The processing unit may be configured to generate the display signal based on operator input. The input device may include a button configured to receive an operator input to activate the processing unit. Further, in one aspect, the processing unit is configured to generate the display signal each time that the processing unit is activated by the input device. The maintenance information may include a maintenance due date, an automatic maintenance reminder message, and an automatic maintenance due message. It may also include a serial number, number of jumps, and battery voltage. Further, the maintenance information may be the time period remaining until the maintenance is due and/or the time period since performance of prior maintenance.

In another exemplary aspect, a display may be configured to show a parameter at an initial parameter setting, the parameter being indicative of an altitude. An input device may be configured to adjust the parameter from the initial parameter setting to a desired parameter setting, and the memory may be configured to store the desired parameter setting in the automatic activation device.

In another aspect, the processing unit may be configured to display the maintenance information for increasing lengths of time as a maintenance due date approaches, and in another aspect, to display varied messages depending on the urgency of the maintenance.

In another exemplary aspect, the invention is directed to a computer usable medium having computer readable code embodied therein for an automatic activation device. The computer readable code may include a storing module configured to store maintenance information related to a status of the device for deploying the parachute, a generating module configured to generate a display signal indicative of the maintenance information, and a communication module configured to communicate the display signal to a display.

In another exemplary aspect, the invention is directed to a method of customizing an automatic activation device for deploying a parachute. The method may include displaying a parameter at an initial parameter setting, the parameter being indicative of an altitude. An adjustment of the parameter may be provided for with an input device from the initial parameter setting to a desired parameter setting. The desired parameter setting may be stored in the automatic activation device.

In another exemplary aspect, the parameter is a height above ground level and/or an altitude based on absolute air pressure. The initial parameter setting may be determined by the automatic activation device during a self-test.

In another aspect, the method may include displaying at least one of: a maintenance due date, an automatic maintenance reminder message, and an automatic maintenance due message.

In yet another aspect, providing for an adjustment of the parameter may include increasing and/or decreasing the parameter. The desired parameter setting may correspond to an altitude at a drop zone.

In one aspect, the activation device is configured to be utilized with military parachute equipment, and in another aspect, the adjustment is performed by one of a parachutist, a rigger, and a member of a military organization.

In another aspect, a trigger altitude is determined based on the desired parameter setting. The automatic activation device may be configured to deploy the parachute at the trigger altitude during a free fall. In another aspect, maintenance information is displayed.

In yet another aspect, providing for an adjustment of the parameter includes changing a single digit of the parameter at a time. In one aspect, a training mode and an operational mode may be selectively operated, the providing being performed in the operational mode.

In another exemplary aspect, the invention is directed to an automatic activation device for deploying a parachute. The device may include a display unit configured to display an initial parameter indicative of an altitude, an input device configured to adjust the parameter from the initial parameter setting to a desired parameter setting, and a memory configured to store the desired parameter setting in the automatic activation device.

In another exemplary aspect, the invention is directed to a computer usable medium having computer readable code embodied therein for an automatic activation device. The computer readable code may include an output module configured to generate a signal indicative of an altitude for a display and an adjusting module configured to adjust a parameter indicative of an altitude based on an input. The code may also include a storing module configured to store a parameter indicative of an altitude.

In another exemplary aspect, the invention is directed to a system for deploying a parachute at a desired altitude with an automatic activation device. The system includes a sensor secured in a housing of the automatic activation device and a housing sealed with at least one sealing material. The sensor may be disposed within the housing. A filter may be associated with the housing. The filter may include a first and a second membrane disposed within a filter housing. At least one of the first and second membranes may be configured to allow airflow to pass through the filter into the housing and may be configured to prevent passage of liquid through the filter into the housing.

In one embodiment, the filter may include a front face and a back face, with the front face being permeable to air and water. In another embodiment, the front face of the filter may be impermeable to water for up to fifteen minutes at a depth less than 15 feet.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1 is a diagram of an exemplary parachuting scenario;

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

FIG. 1 depicts an exemplary parachuting scenario: a parachutist 100 jumps from an airplane 102, freefalls for a period of time, then deploys a parachute 104 to land safety on the ground. For added safety, parachutist 100 may carry a second, or reserve, parachute that can be deployed if parachute 104 fails. Parachute 104 may fail, for example, if it is damaged during the jump from airplane 102 or if it becomes tangled during freefall. If the parachute 104 fails, the reserve parachute may be deployed manually by parachutist 100 or automatically by an automatic activation device (AAD) (described further below).

Figure 2:
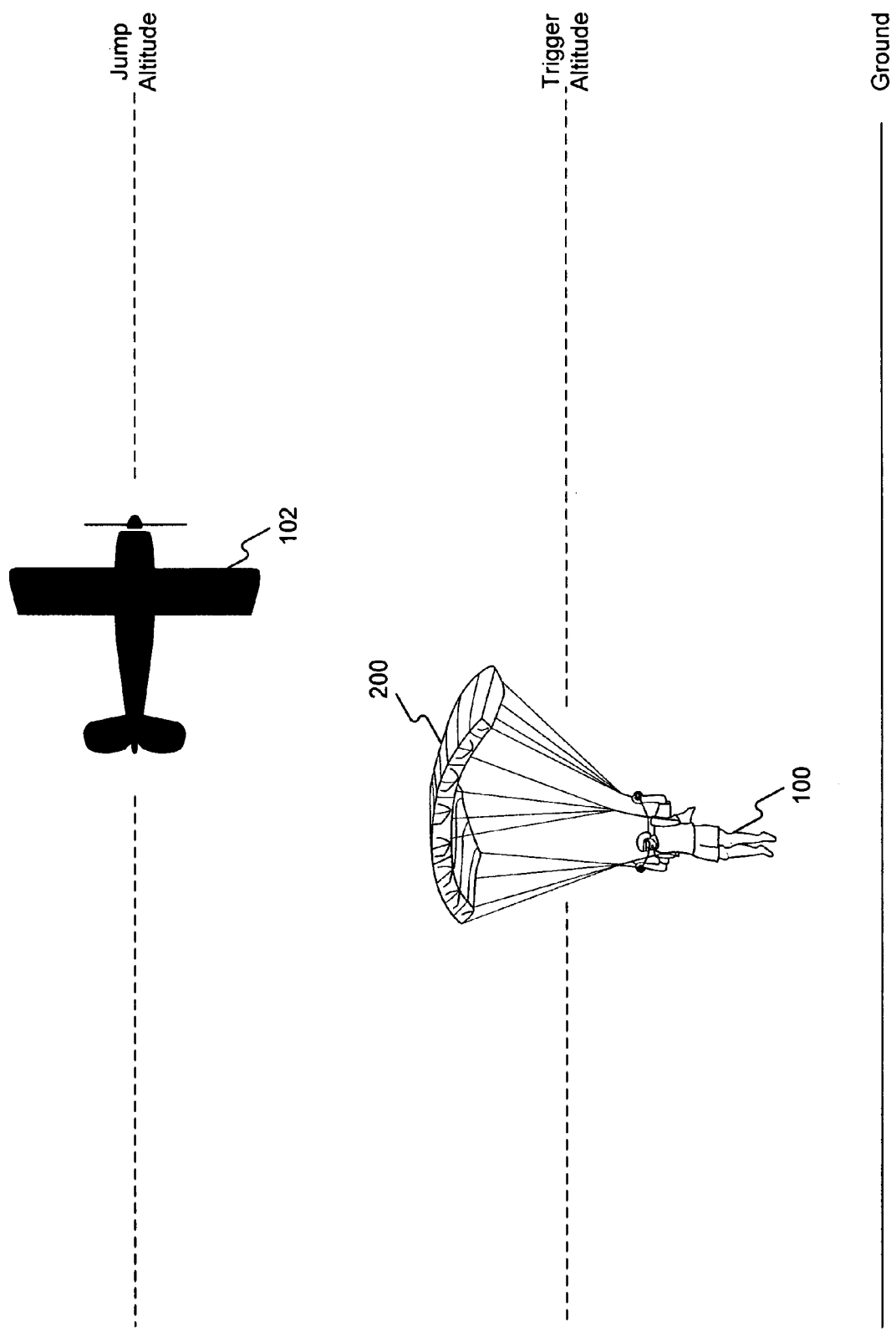
FIG. 2 is a diagram of an exemplary scenario in which an AAD may trigger a reserve parachute.

FIG. 2 depicts a scenario in which an AAD may trigger a reserve parachute 200. Parachutist 100 jumps from airplane 102 at a jump altitude, e.g., 13,500 feet. The AAD is carried by parachutist 100 and may be set to deploy reserve parachute 200 if parachutist 100 passes below a specified trigger altitude (e.g., 1,900 feet) while exceeding a specified rate of descent. In this way, even if parachutist 100 is incapable of manually deploying reserve parachute 200, the AAD will deploy the reserve parachute 200, thereby allowing the parachutist 100 to reach the ground safely.

Figure 3:
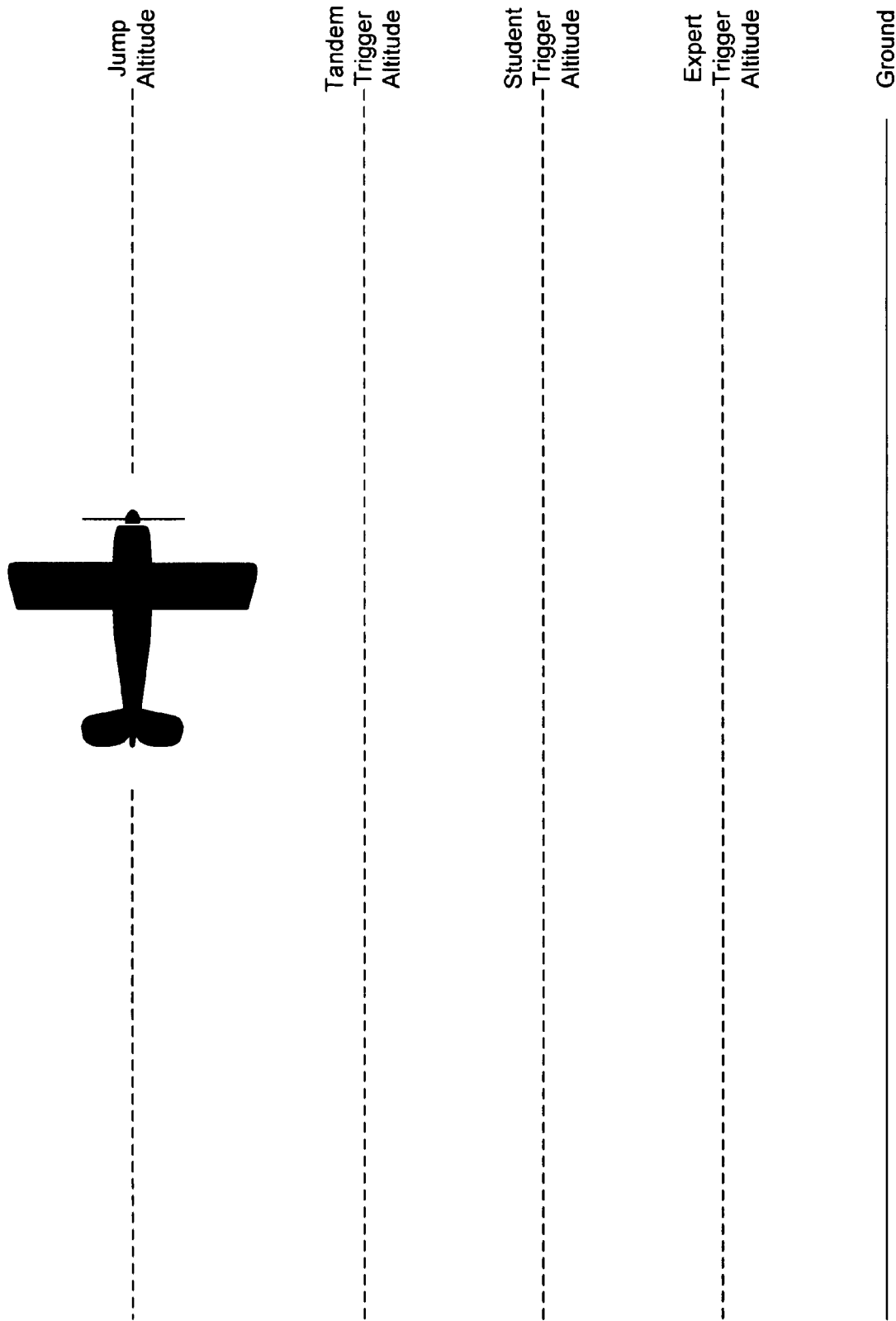
FIG. 3 is a diagram showing various exemplary trigger altitudes that may be used in an implementation of the present invention.

FIG. 3 illustrates various exemplary trigger altitudes that may be selected and configured for a particular AAD. The trigger altitude may be any threshold altitude and may be set by the parachutist or a rigger based on the situations where it is to be used. For example, a different trigger altitude may be set for a tandem parachutist (i.e., two people sharing a parachute), a student parachutist, and an expert parachutist.

For instance, the tandem trigger altitude may be 1900 feet while the student trigger altitude may be 1000 feet, and the expert trigger altitude may be 750 feet. For example, an expert parachutist may desire as much freefall as possible to perform tricks or to allow time to create formations with other parachutists. Thus, the expert's AAD can be set to allow the maximum amount of freefall time so that it does not interfere with the expert's parachuting skills. Meanwhile, a tandem parachutist may take longer to land safely than a single parachutist, so the tandem AAD can be adjusted or set to deploy the reserve parachute earlier during freefall. The trigger altitudes may also be based on other considerations, such as parachutist weight or weather conditions.

Figure 4:
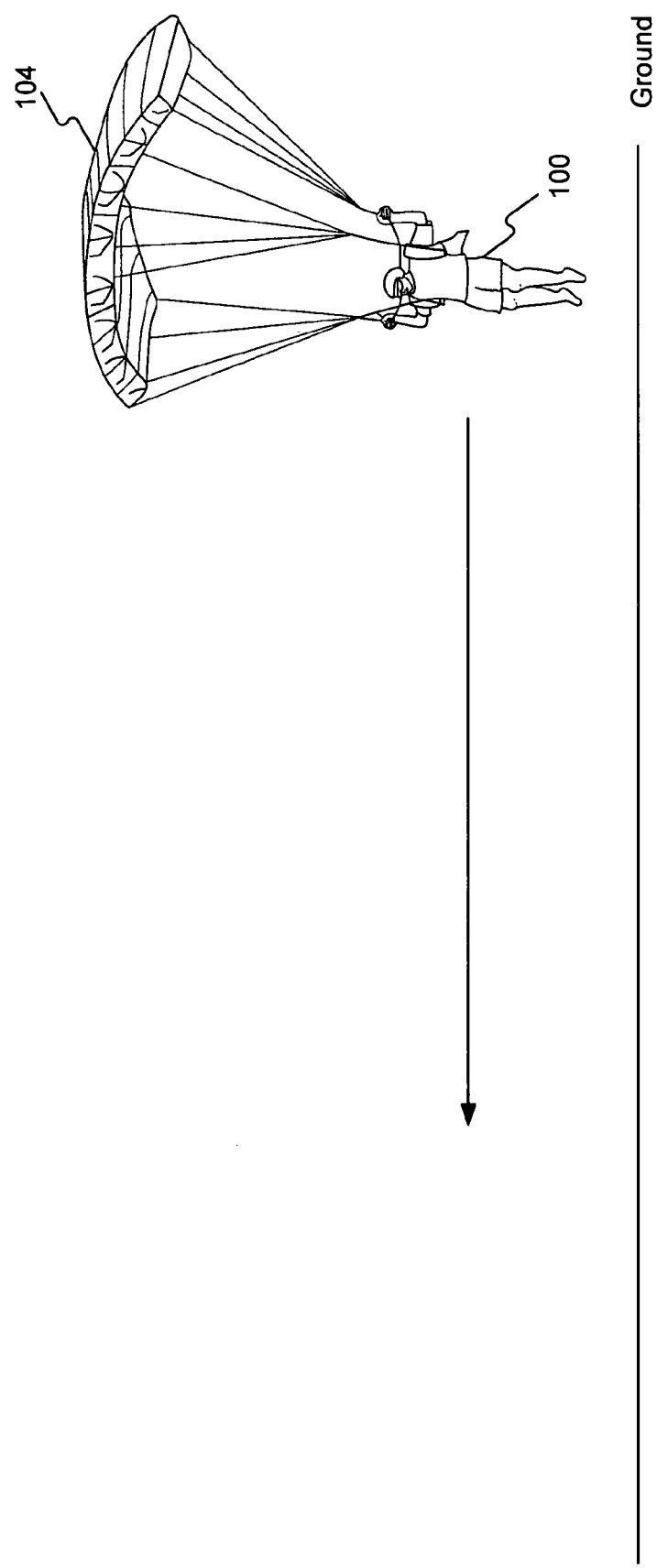
FIG. 4 is a diagram of a parachuting activity known as "swooping"

FIG. 4 depicts a parachuting activity known as "swooping," in which the parachutist 100 maneuvers parachute 104 in order to skim the ground for several yards prior to landing. This is one type of activity that may be performed, for example, by an expert parachutist.

Figure 5A:
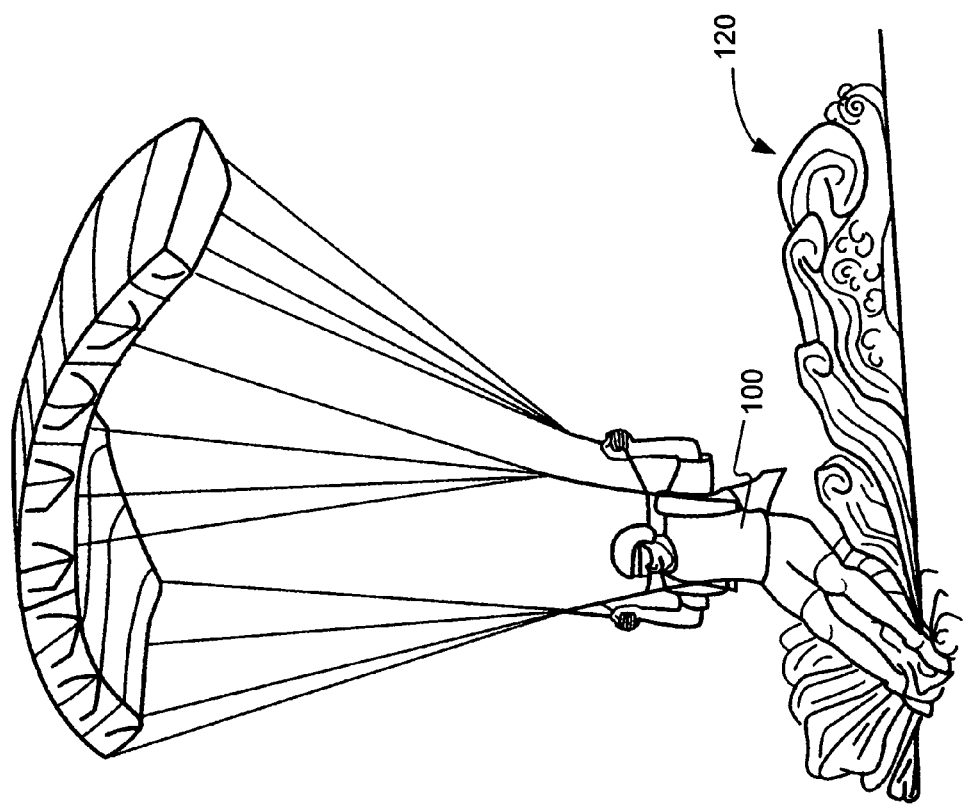
FIGS. 5A and 5B depict variations of swooping, known as "pond swooping"
Figure 5B:
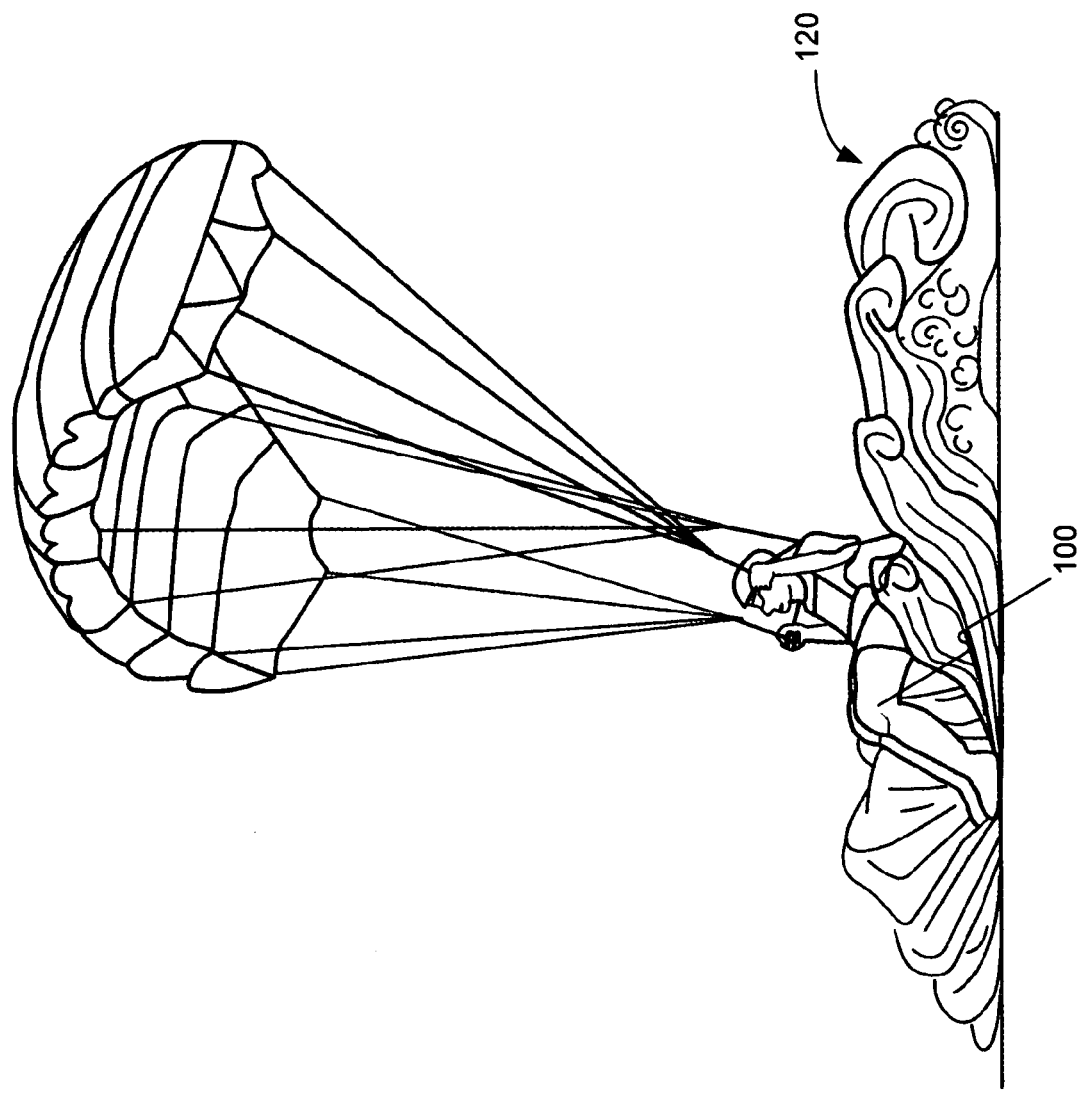

FIG. 5A depicts a variation of swooping known as "pond swooping," in which the parachutist 100 skims a body of water prior to landing. FIG. 5B illustrates pond swooping that may result in parachutist 100 getting wet, along with his parachute gear and the AAD. In one exemplary embodiment consistent with the present invention, the AAD may be water-resistant, thereby protecting the AAD from water damage that may occur during pond swooping or other water-related activities. Furthermore, the AAD may be configured in a manner to require only simple maintenance once it has gotten wet, enhancing the utility of the AAD. The simple maintenance is described below with reference to FIGS. 9A–9D.

Figure 6A:
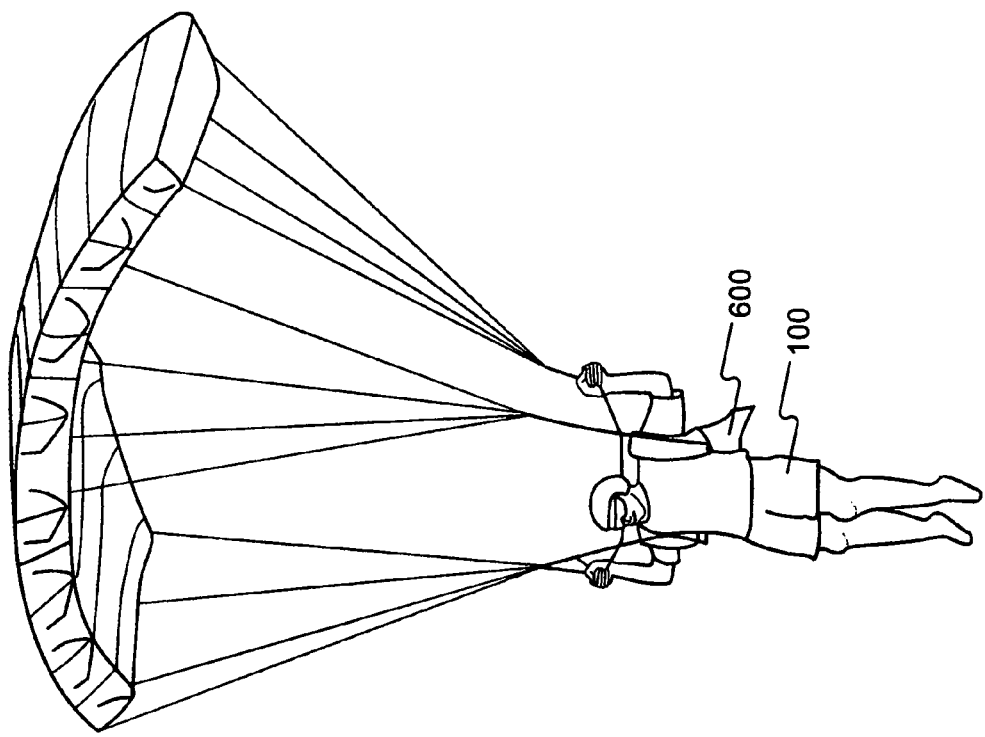
FIG. 6A is a diagram of a parachutist with an exemplary parachuting rig that may be used in an implementation of the present invention.

FIG. 6A depicts parachutist 100 with a parachuting rig 600, consistent with an exemplary embodiment of the invention. The parachuting rig 600 may contain both a primary parachute and a reserve parachute folded within for deployment. Rig 600 may also contain an automatic activation device (AAD), described below with reference to FIG. 6B.

Figure 6B:
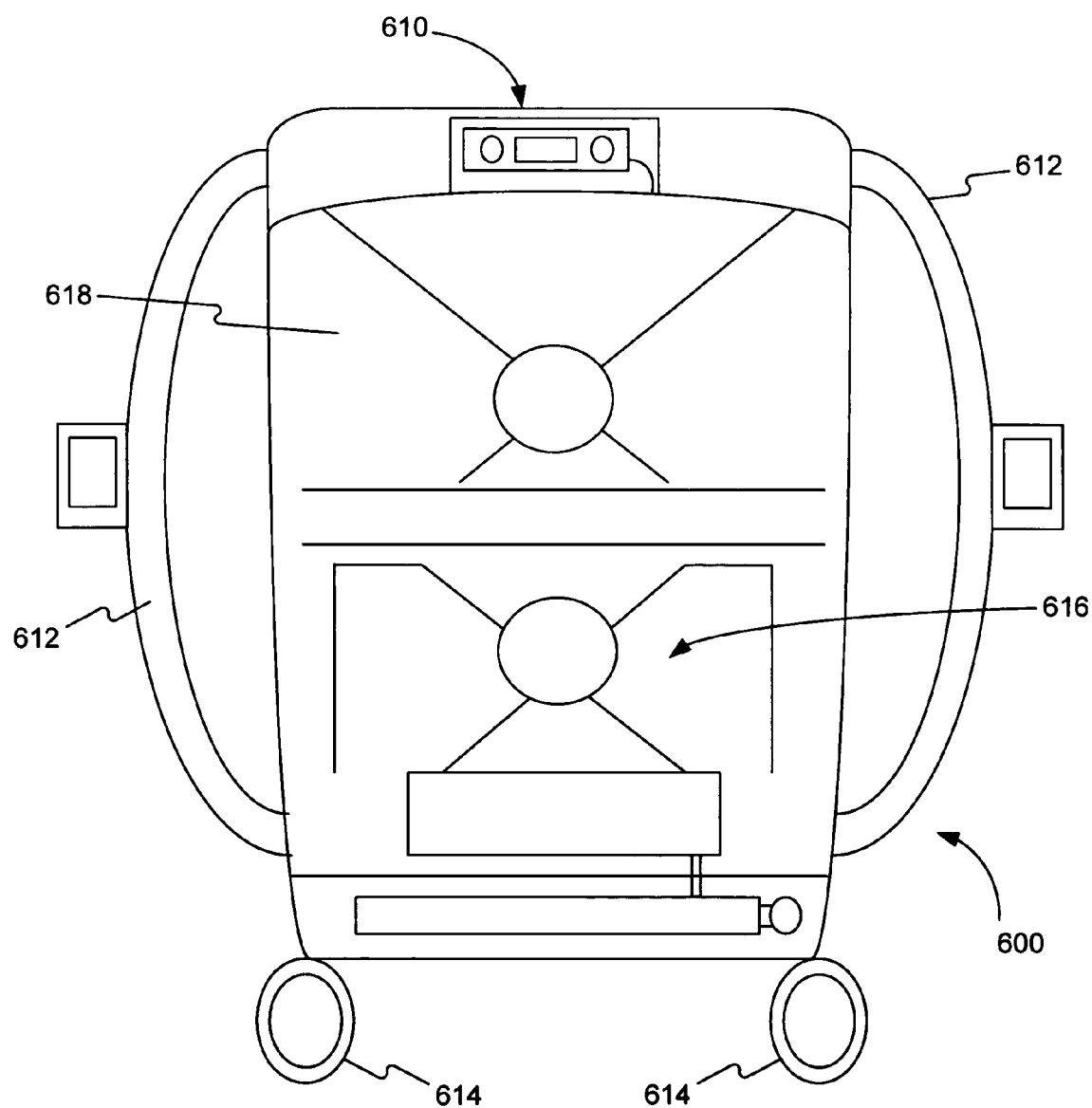
FIG. 6B is a diagram of a parachuting rig including an automatic activation device (AAD) that may be used in an implementation of the present invention.

FIG. 6B depicts the rig 600 including an automatic activation device (AAD), consistent with an embodiment of the present invention. The rig 600 may include arm loops 612, leg loops 614, a main canopy 616, and a reserve container 618. The AAD 610 may be associated with the reserve container 618 in a manner that it may open the reserve container 618 to deploy a reserve parachute. The AAD 610 may be partially or fully disposed in the reserve container 618 and, in one exemplary embodiment, may be accessible from an exterior of the container.

The AAD 610 may be configured in a manner that it is user friendly. For example, in one exemplary embodiment, the AAD may be configured to be switched on prior to the first jump of the day, and then configured to require no additional attention. In this exemplary embodiment, the AAD need not be switched off because AAD 610 may be configured to do this automatically. Once switched on, the AAD 610 may continuously or intermittently check the air pressure over the course of the day so that the AAD 610 may be substantially calibrated to the air pressure at the ground level. In one exemplary embodiment, the AAD 610 may check the air pressure twice per minute. Accordingly, the AAD 610 may compensate for changes meteorologic influences that may fluctuate throughout the day, including air pressure changes from weather fronts, etc.

The AAD 610 may be associated with the rig 600 in a way that it may not restrict the movement of the parachutist. Accordingly, the parachutist may be free to perform extreme maneuvers when exiting the plane and during freefall, such as spiral turns, down planes, hookturns with the smallest canopies, as well as any canopy relative work (CRW). The AAD 610 may be configured to analyze any movement of the parachutist without interfering with normal activities while parachuting. Only a freefall to the preset threshold altitude will cause the AAD 610 to take action. In one exemplary situation, the AAD 610 may be configured to activate the reserve parachute at an altitude that corresponds to about, for example, 4.5 seconds prior to impact.

Figure 7:
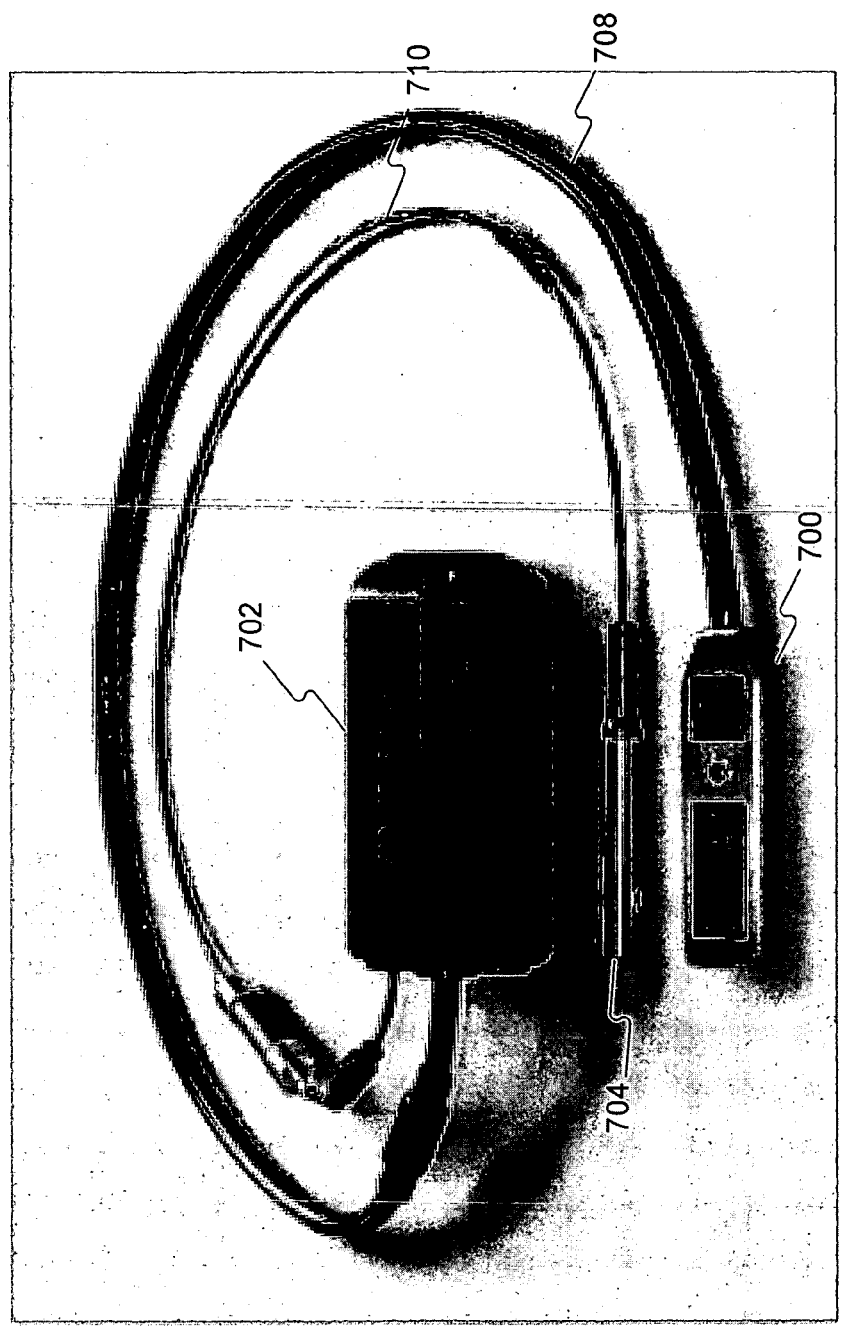
FIG. 7 is a diagram of an exemplary AAD according to one aspect of the present invention.

FIG. 7 is a diagram of AAD 610 in greater detail, consistent with an embodiment of the present invention. In one embodiment, AAD 610 includes a control unit 700, a processing unit 702, and a release unit 704. The control unit 700 is described in greater detail with reference to FIG. 8A, the processing unit 702 is described in greater detail with reference to FIG. 9A, and the release unit 704 is described in greater detail with reference to FIG. 10A.

The control unit 700 may connect to and communicate with the processing unit 702 through a communication cable 708, while the release unit may connect to the processing unit 702 through a release cable 710. The AAD 610 may also include a maintenance-free power supply (not shown). The maintenance-free power supply may be associated with at least one of the control unit 700, the processing unit 702, and the release unit 704, and may be configured to provide power to operate the AAD 610. In one exemplary embodiment, the maintenance-free power supply is a battery configured to provide the power necessary to operate the AAD and deploy the reserve parachute, if necessary.

In one embodiment, the AAD 610 is water resistant up to a water depth of approximately fifteen feet (five meters) for a duration of approximately fifteen minutes. In this embodiment, one or both of the control unit 700 and the processing unit 702 may be sealed to prevent water from entering and damaging components of the units. In addition, a cutter of the release unit 104 may be sealed to prevent water damage.

Figure 8A:
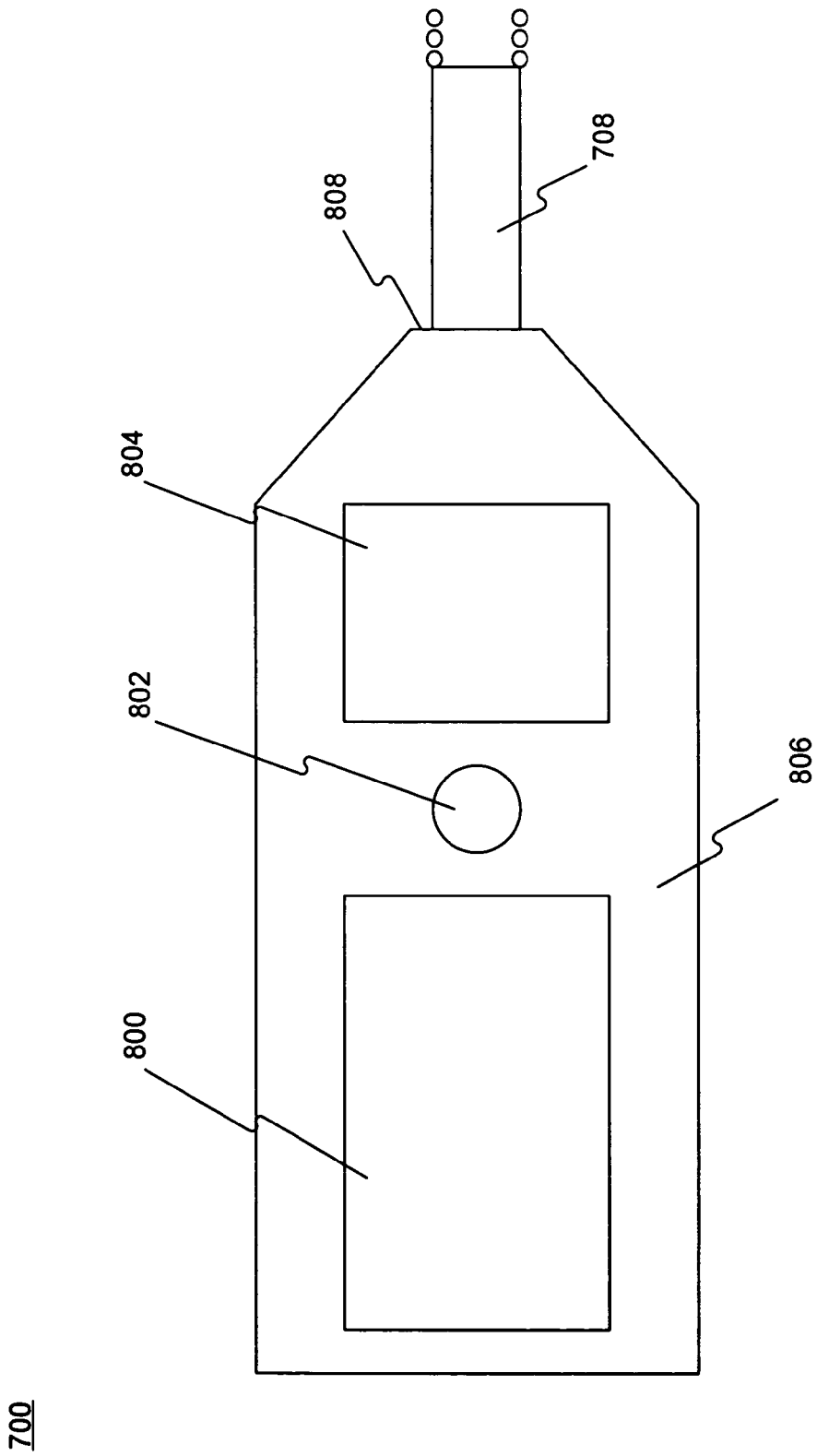
FIG. 8A is a diagram of an exemplary control unit according to one aspect of the present invention.

FIG. 8A shows one exemplary embodiment of the control unit 700 from FIG. 7 in greater detail. In this embodiment, the control unit 700 includes a display 800, a light 802, an input device such as a pushbutton 804, all disposed in a common housing 806. The communication cable 708 extends from a communication port 808 in the housing 806, and connects to the processing unit 702, as shown in FIG. 7.

The display 800 may be configured to display images to the parachutist and/or a rigger. In one exemplary embodiment, the display 800 is an LCD display capable of showing symbols, including, for example, letters, numbers, and arrows. The light 802 may be a visible indicator to the parachutist and/or rigger and, in one exemplary embodiment, is an LED light. It may be a colored LED, such as red, and in one exemplary embodiment, may be an LED capable of alternately glowing with more than one color. The input device may be the pushbutton 804, but may be any other known input device, including a dial and/or a keypad, among others. In one exemplary embodiment, the display 800 is a touch-screen input device.

The control unit 700 is configured to receive inputs from an operator through the pushbutton 804, thereby enabling the operator to turn the AAD 610 on and off; change altitude reference data prior to use, such as the altitude of a drop zone; view the AAD serial number; and view maintenance information, such as the next scheduled maintenance date. In one exemplary embodiment, the AAD 610 is switched on by pressing the pushbutton 804 four times with very short clicks. Pressing the pushbutton 804 the first time may begin a switch-on cycle. In one exemplary embodiment, the switch-on cycle may follow a preset sequence. For example, after pressing the pushbutton 804 the first time to initiate the switch-on cycle, the light 802 may glow, providing a visible indicator to the parachutist. Parachutist 100 may acknowledge the glowing light 802 by clicking the pushbutton 804 a second time, thereby continuing the switch-on cycle. In one exemplary embodiment, this sequence—a click following appearance of the light—may be repeated two more times. After a total of four clicks, the AAD 610 may be on or active. The AAD 610 may be configured so that if the parachutist 100 does not act promptly after seeing the light 802, or if he pushes the pushbutton 804 too soon, the AAD 610 may ignore the switch-on attempt. The exemplary switch-on cycle described herein, using a multiple-click initiating cycle, may help to avoid accidental switch-on, which may result in wasted power and may inadvertently drain the power supply.

Once the switch-on cycle is complete, the control unit 700 may perform a self-test, during which important internal functions may be checked. In one example, the self-test may take about ten seconds, and the display 800 may show a countdown from "10 to "0" to represent the number of seconds left until completion of the self-test. When the "0" is displayed, along with a downward pointing arrow, the control unit 700 may be activated and functional for the next fourteen hours. If the self-test is unsuccessful, the display 800 may show an error code for a period of time, such as approximately two seconds, indicating why the self-test process failed. The self-test may be unsuccessful in situations where the power supply is too low, among other situations. After displaying an error, the AAD 610 may switch itself off immediately.

If no errors arise during self-test, however, the control unit 700 may be configured to switch itself off automatically after fourteen hours, thereby conserving power. In one exemplary embodiment, the AAD 610 also may be manually switched-off using the pushbutton 804. Although it could be switched-off using any number of methods, in one exemplary embodiment, the manual switch-off sequence may be the same as the switch-on cycle (for example, click, light, click, light, click, light, click). This routine may help to avoid accidental switch-off.

The display 800 may be configured to show an altitude setting, including the trigger or threshold altitude, as well as an airfield altitude and a drop zone altitude. The drop zone altitude may also be determined as a function of the absolute pressure at the drop zone. In one exemplary embodiment, the control unit 700 may be configured so that the drop zone altitude is set to correspond to an airfield altitude and may be established by the pressure readings taken during the self-test described above. This may be a default setting, convenient when the altitude of the drop zone and the airfield correspond.

In one exemplary embodiment, the AAD 610 is configured to selectively shift between a "training" mode and an "operational" mode. The training mode may operate substantially as described above, with the drop zone altitude that is set to correspond to an airfield altitude. The operational mode may operate so that the a parameter indicative of the drop zone altitude, such as height or air pressure, may be adjusted to compensate for instances where the drop zone altitude is different than the airfield altitude. In one exemplary embodiment, the operational mode is used by military personnel in a military model of the AAD, while in another exemplary embodiment, the operational mode is used by civilians in a civilian model of the AAD.

Figure 8B:
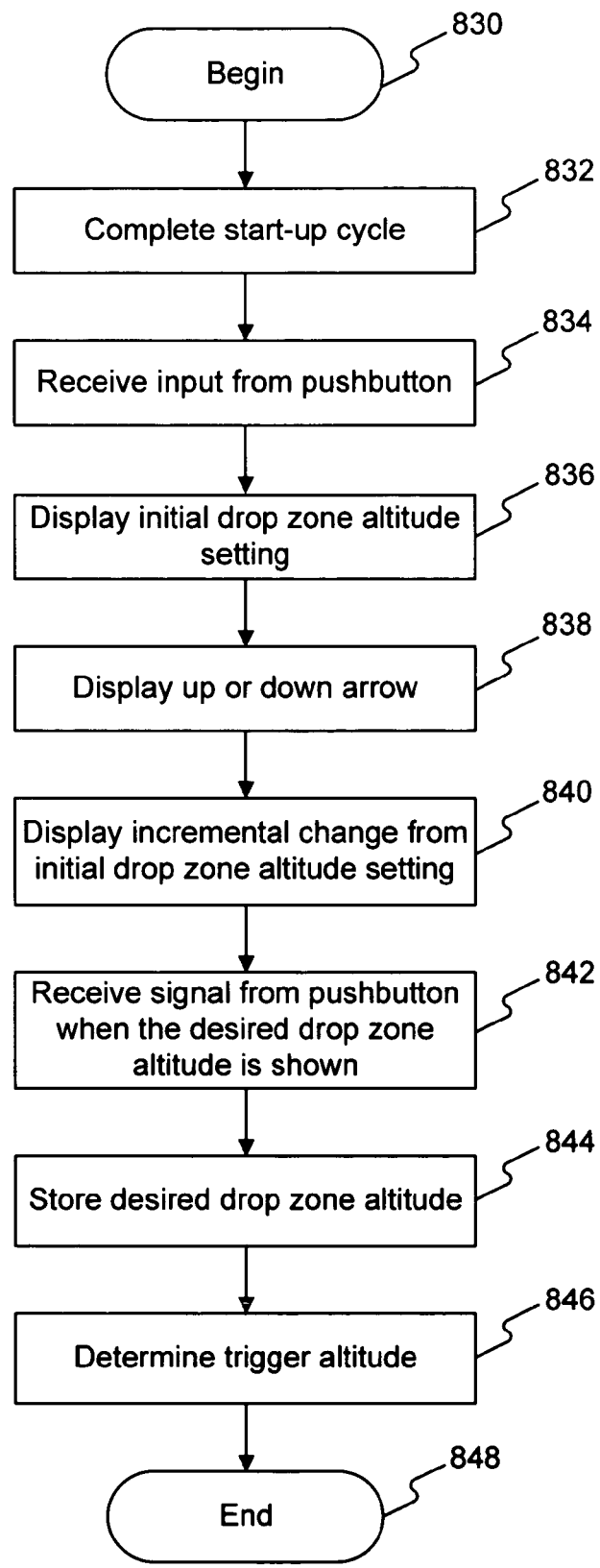
FIG. 8B is a flow diagram of exemplary steps for setting a drop zone altitude performed by a control unit according to an implementation of the present invention.

In one exemplary embodiment of an AAD with an operational mode capability, the parachutist 100 may set or adjust the drop zone altitude to a desired setting using the pushbutton 804. One exemplary method for setting or adjusting the drop zone altitude is described with reference to FIG. 8B. The method in FIG. 8B may be used, for example, in a civilian model AAD. The method begins at a step 830. To change the drop zone altitude, in one exemplary embodiment, the parachutist 100 may complete the start up cycle at a step 832, as described above. After the AAD 610 is on and operational, then the parachutist 100 may again press pushbutton 804. Accordingly, at a step 834, an input is received from the pushbutton 804. It should be noted that although the method describes pressing the pushbutton 804 after the start up cycle is ended, the AAD 610 may be configured so that the step 834 may also be performed when the pushbutton 804 is pressed as a part of the start up cycle.

While the pushbutton 804 is pressed, and at a step 836, the control unit 700 may display a current, initial drop zone altitude setting. This initial drop zone altitude setting may be a setting established during the start up cycle as described above, and may correspond to the air field altitude. At a step 838, the control unit 700 may display an up arrow or a down arrow. The up or down arrow may indicate whether the altitude will shift up or down from the initial drop zone altitude setting. At a step 840, the drop zone altitude setting increases or decreases (depending on the direction of the respective arrow), in increments of, for example, thirty feet or ten meters on the display 800. The arrow may alternately point up, indicating the pushbutton 804 will increase the drop zone altitude setting, and down, indicating the pushbutton 804 will decrease the drop zone altitude setting.

The parachutist 100 may continue to press the pushbutton 804 until the desired drop zone altitude is shown on the display 800. When the desired drop zone altitude is shown, the parachutist 100 may release the pushbutton 804, thereby signaling with the pushbutton 804 that the desired altitude is shown, at a step 842. The desired drop zone altitude may then be stored in the control unit 700 or processing unit 702 at a step 844. At a step 846, the AAD 610 may determine the trigger altitude as a predetermined height above the drop zone altitude. The method ends at a step 848.

Although adjustment of the drop zone altitude is described in terms of altitude, the AAD 610 may be configured to show an absolute air pressure, and the parachutist may be able to adjust and select a desired absolute air pressure, such as an absolute air pressure that may correspond to the absolute air pressure at the drop zone. In one exemplary embodiment, this feature is used in military jumps, allowing paratroopers and/or soldiers to customize the drop zone altitude or absolute air pressure.

Figure 8C:
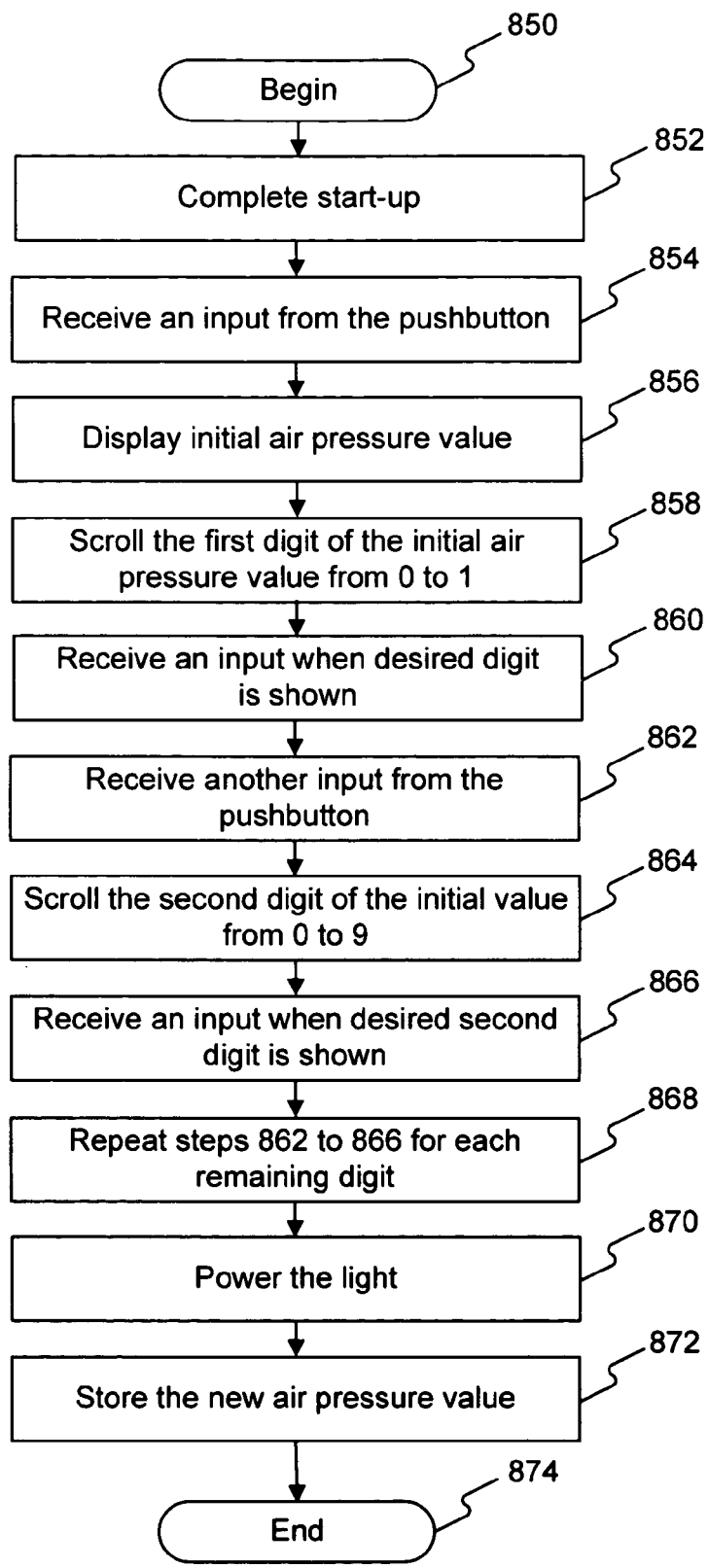
FIG. 8C is a flow diagram of exemplary steps for setting a drop zone air pressure performed by a control unit according to an implementation of the present invention.

Another exemplary method for setting or adjusting the drop zone altitude is described with reference to FIG. 8C. The method in FIG. 8C may be used, for example, in a military model AAD. The method begins at a step 850.

The parachutist 100 may complete the start up cycle at a step 852, as described above. After the AAD 610 is on and operational, then the parachutist 100 may again press and hold the pushbutton 804. Accordingly, at a step 854, an input is received from the pushbutton 804. It should be noted that although the method describes pressing the pushbutton 804 after the start up cycle is ended, the AAD 610 may be configured so that the step 834 may also be performed when the pushbutton 804 is pressed as a part of the start up cycle.

At a step 856, the control unit 700 may display a preset number, such as "1000," representing an initial air pressure value. The air pressure value may be displayed in mbars, in hectoPascals, or other units. While the pushbutton is pressed, the first digit of the initial value scrolls through a range of single digits. In one exemplary embodiment, the first digit if the initial value scrolls from one to zero, at a step 858. When the desired digit is displayed, the pushbutton may be released, thereby providing an input signal that the digit should no longer be scrolled, at a step 860.

At a step 862, the pushbutton 804 is again pressed, thereby generating an input. The second digit of the initial value is then scrolled from zero to nine, at a step 864. When the desired digit is displayed, the parachutist 100 may release the pushbutton 804, thereby providing an input signal that the second digit should no longer be scrolled at a step 866. It should be noted that if the desired digit is missed, the pushbutton 804 may be held until the desired digit appears again. Steps 862 to 866 may be repeated for each remaining digit of the initial value at a step 868. When the final digit is set as described above, the light 802 may glow at a step 870, providing a visual indicator to the parachutist that the new drop zone air pressure is set. At a step 872, the new drop zone air pressure is stored. The method ends at a step 874.

In one exemplary embodiment, the drop zone altitude may be programmed prior to take-off to a separate drop zone elevation. The parachutist may also program the drop zone altitude when in flight, in an active pressurized cabin, or any time prior to a jump.

In one embodiment, after the parachutist programs the drop zone altitude, the AAD 610 then calculates the appropriate activation altitude above the drop zone altitude, based on factory pre-programmed settings. It should be noted that such a system simplifies a jumpmaster's job on an operation jump, such as military jump, by allowing the jumpmaster to set all the AADs to the same drop zone setting, even though they may be preprogrammed to deploy at different trigger altitudes (e.g. 1500 ft. for solo jumper, 2500 ft. for tandem jumper, etc.).

The trigger altitude may also be customized by inputting a drop zone altitude that is different than the actual drop zone altitude. For example, an expert parachutist may use a student AAD that is programmed to deploy the reserve parachute at 1500 feet above the drop zone. By programming the AAD with a drop zone altitude that is 500 feet lower than the actual drop zone altitude, the expert may still be able to program the AAD so that it deploys the reserve chute at 1000 feet above the actual drop zone.

Figure 8D:
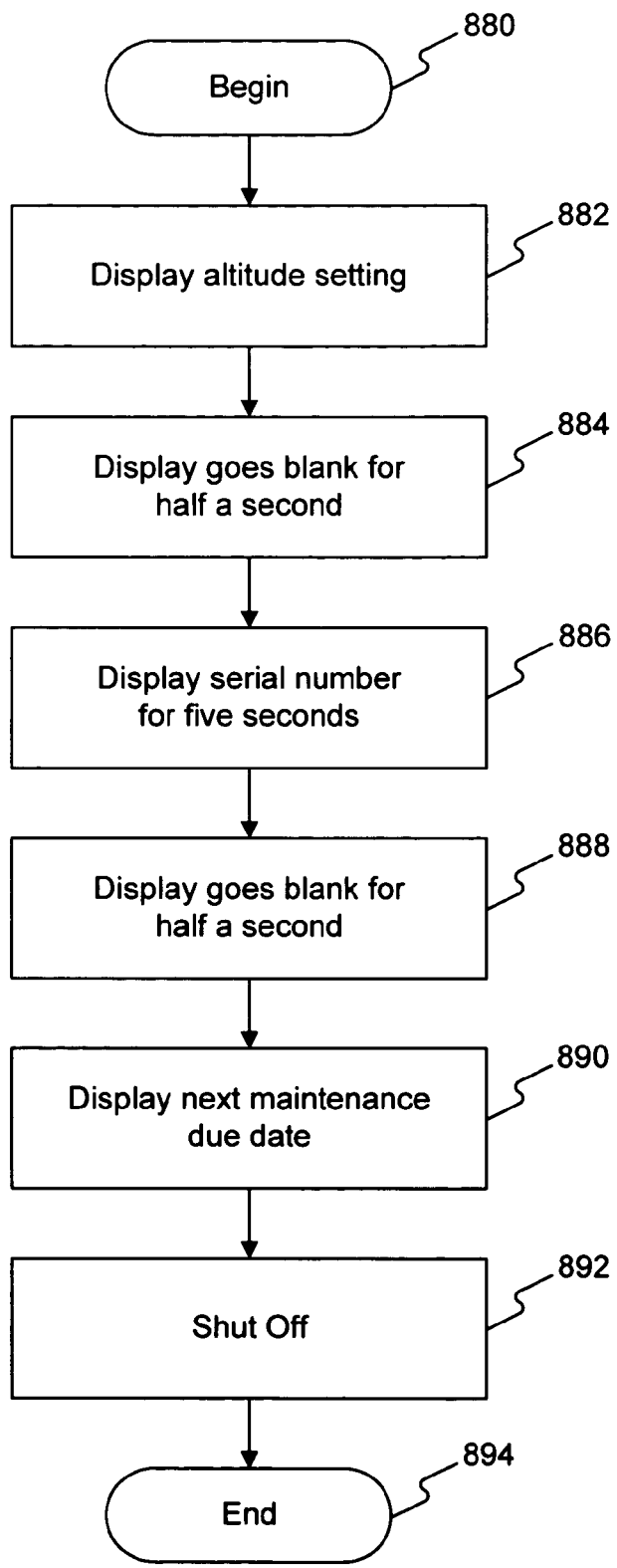
FIG. 8D is a flow diagram of exemplary steps performed by a control unit according to an implementation of the present invention.

The control unit 700 may also be configured to display a serial number and maintenance information for the AAD 610. The maintenance information may include a next maintenance due date. One exemplary method for displaying the maintenance information is described with reference to FIG. 8D. The method begins at a step 880. After the altitude setting is shown at a step 882, the display 800 may be blank for half a second, at step 884. Then, the AAD 610 may display the serial number on the display 800 for five seconds, at a step 886. Accordingly, during this time, the serial number may be viewed, acknowledged, and/or recorded by the parachutist. At a step 888, the display 800 may be cleared or blank for half a second, and may then show the month and year of the next maintenance due date, at a step 890. The maintenance due date may be shown for a period of time, such as, for example, five seconds. Finally, the control unit 700 may shut off at a step 892. Accordingly, the AAD 610 may be configured to display varied messages, depending on the urgency of the maintenance, as described below. It should be noted that this sequence, as well as the other sequences described herein, are exemplary sequences only, and this application is intended to cover changes and deviations from these exemplary sequences.

In one embodiment, the maintenance due date and serial number may be displayed upon a request by the parachutist. The request may include a button sequence using the pushbutton 804. In another embodiment, the display 800 may show maintenance information such as an automatic maintenance reminder message as the maintenance due date approaches. In yet another embodiment, the display 800 may show an automatic maintenance due message after the due date, with increasing message display time. As used herein, maintenance information may be representative of at least one of: a current status of a measurable parameter, such as battery voltage; a lapsed time period, such as a date when previous maintenance was performed; a remaining time period, such as a due date scheduled for the next maintenance and/or the number of days, weeks, or months until the scheduled due date; and a number of iterations of a certain process or the a number of uses, such as the number of jumps taken since the last maintenance date; among other information.

In one exemplary embodiment, the maintenance due date is updated during a factory maintenance procedure to the date of the next required maintenance. In one exemplary embodiment, the maintenance due date may be four years from the date that the AAD was last serviced. In one embodiment, six months before a maintenance due date, the AAD may automatically show the maintenance due date at each self-test on display 800, including the due date month and year. The self-test may be interrupted during the countdown and the maintenance information may be shown for five seconds on the display 800. When the actual maintenance due date arrives, the AAD 610 may display "next maint. now" on the display 800 at each start up. Accordingly, the AAD 610 may be configured to display varied messages, depending on the urgency of the maintenance.

In some exemplary embodiments, the display 800 may show additional information. For example, in one embodiment, the display 800 may show a current absolute air pressure reading. Accordingly, the parachutist may be able to visually monitor the air pressure by observing the display 800.

In one exemplary embodiment, the control unit 700 is water resistant. The control unit 700 includes a layer of silicone on a top surface of display 800, and a layer of silicone on light 802. The housing 806 may be formed of a water resistant material, such as a molded polymer, and the communication port 808 may be sealed about the communication cable 708, for example, with sealed plug connections and/or an adhesive material, such as, for example, glue and/or grout. In addition, gaskets or other seals may be used to ensure water does not enter the housing 806. The pushbutton 804 may be made waterproof inside control unit 700. The bottom surface and the cable entrance may be sealed by an adhesive, to protect control unit 700 from water.

Figure 9A:
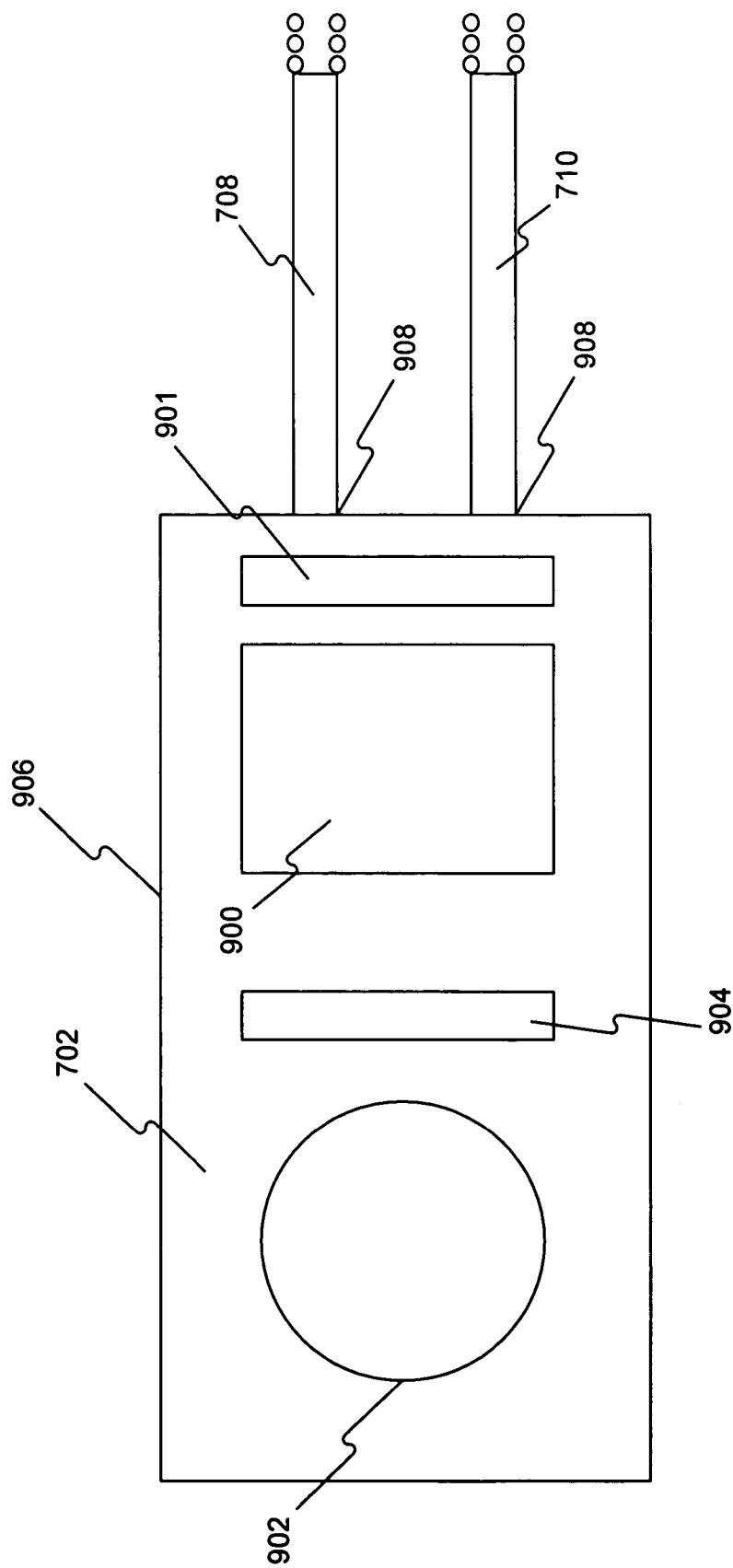
FIG. 9A is a diagram of an exemplary processing unit according to one aspect of the present invention.

The processing unit 702 is shown in greater detail in FIG. 9A. The processing unit 702 may include, among other things, a processor 900, a memory unit 901, a filter 902, and a sensor 904, all housed in a common housing 906 of the automatic activation device. The communication cable 708 and release cable 710 may extend from communication ports 908 in the housing 906 to the control unit 700 and the release unit 704, respectively. The processor 900 may be, for example, a factory-programmed microprocessor that is capable of real-time calculations of the jumper's altitude and rate of descent based on barometric pressure. The memory unit 901 may be associated with the processor 900 and may be configured to store software modules and sequences for execution by the processor based on inputs from the control unit 700 (shown in FIG. 8A) and the sensor 904.

The sensor 904 may be any sensor configured to measure a parameter indicative of an altitude. In one exemplary embodiment, the sensor 904 is an air-pressure sensor configured to measure the air pressure. The sensor 904 may be configured to communicate a signal representative of the monitored parameter to the processor 900 for processing.

In one exemplary embodiment, when AAD 610 is switched on, the processor 900 and sensor 904 may measure the air pressure several times in a short period of time, and take the average air pressure value as the value for ground or airfield level and/or drop zone level, thereby "zeroing" or calibrating itself. This may happen during the self-test after the switch-on cycle. Further, while the AAD 610 is in use, the processor 900 may continually check the air pressure while on the ground and, if necessary, adjust to compensate for changing weather conditions, e.g., changing air pressure, in order to maintain an accurate reading of the air-pressure at ground level. By comparing the ground level air pressure to an air pressure during freefall, the AAD 610 may be configured to recognize the trigger altitude and/or the speed of descent. By monitoring this data and/or additional data, the AAD 610 may draw certain conclusions. Should the conclusion be that the jumper is in a dangerous situation (i.e., still in freefall at a low altitude) the processing unit 702 may generate and send a release or trigger signal to the release unit 704 to open a reserve container and deploy a reserve parachute. The reserve container may be a portion of the parachutist's rig 600 (shown in FIG. 6) and may contain the reserve parachute.

The filter 902 may be associated with an opening in the housing 906 and may be configured to allow air to pass from outside of the housing 906 to its inside for measurement by the sensor 904, also disposed inside the housing 906 of the automatic activation device.

Figure 9C:
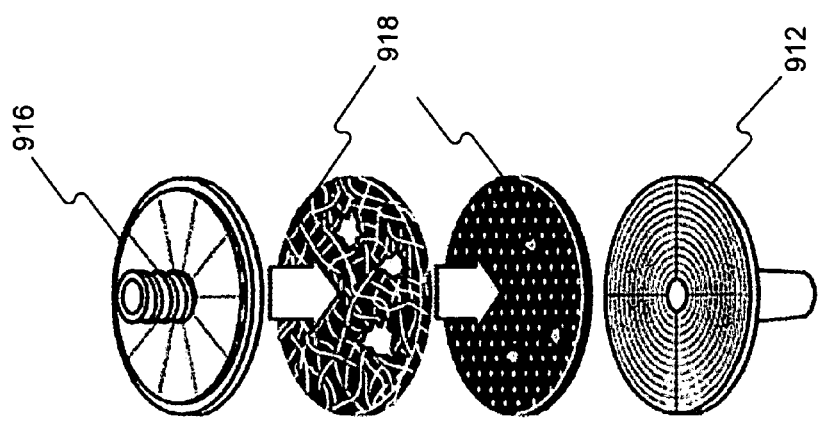
FIG. 9C is a diagram of an exemplary exploded filter according to one aspect of the present invention.
Figure 9B:
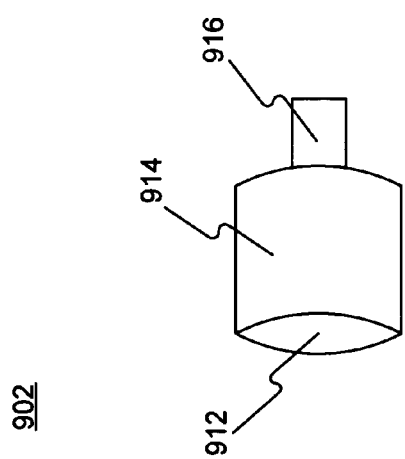
FIG. 9B is a diagram of an exemplary filter according to an implementation of the present invention.
Figure 9D:
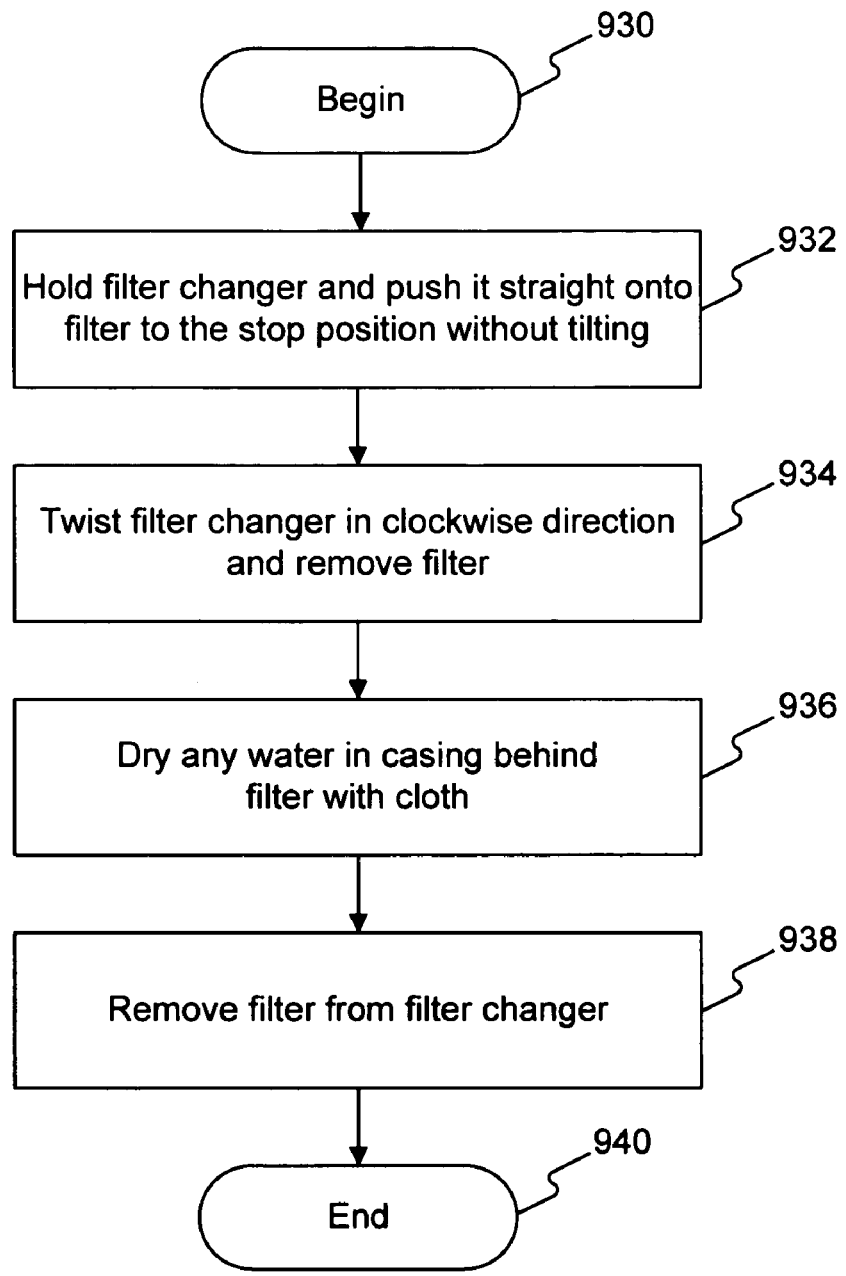
FIG. 9D is a flow diagram of exemplary steps performed to remove a filter from an AAD according to an implementation of the present invention.

As shown in FIGS. 9B and 9C, the filter 902 includes a front face 912, an outer circumference 914, and a luer lock fitting 916. The filter 902 may include one or more membranes 918 that allow passage of air, but not passage of liquid, such as water. In one exemplary embodiment, the membranes 918 are formed of PTFE laminated on polypropylene fleece having a nominal pore size of 1.0 micrometers, having a bubble point of 0.6 bar, and having a dead volume less than 10 micro liters. In one exemplary embodiment, two membranes 918 are included between the front face 912 and a back face, the back face having the luer lock 916 disposed thereon. In one exemplary embodiment, the back face is not permeable to air and the front face is permeable to air. Accordingly, air may pass through the front face 912, the membranes 918, and through a passage formed in the luer lock 916. At least one of the membranes 918 and/or the front face 912 may be configured to prevent the passage of water for up to fifteen minutes, at a depth of less than fifteen feet. The front face 912 and luer lock 916 may be formed of polypropylene. The luer lock 916 may be configured to attach to the housing 906 to associate the filter 902 with the housing 906. In one exemplary embodiment, the housing 906 includes a recess formed therein, with a passage at the bottom of the recess. By being disposed and protected in the recess, the filter 902 may be protected from outer elements.

The filter 902 may be configured to allow air to flow freely so that the air pressure inside the housing 906 is substantially similar to the air pressure outside the housing 906. Accordingly, by monitoring the air pressure in the housing 906, the sensor 904 may determine the altitude of the AAD 610. It should be noted that in one exemplary embodiment, both the filter 902 and the sensor 904 are associated with the control unit 700.

Although the filter 902 may be configured to allow air to freely pass, the filter 902 may also be configured to inhibit passage of liquid, such as water. Accordingly, the design of filter 902 may allow the AAD to operate effectively to monitor altitude, and in addition, be resistant to damage from water during water jumps, allowing AAD 610 to be exposed to water without damaging the sensitive measurement components, including the sensor 904. Accordingly, the filter 902 may allow precise measurement of the air pressure, and at the same time, keep water outside the housing 906 of the processing unit 702. Further, as long as there is no contact with a liquid, such as water, the filter 902 may not need to be replaced by the user. In one exemplary embodiment, however, after water contact, the filter 902 may be configured to be removed and discarded, and a new filter may be installed. As described above, in one exemplary embodiment, the filter 902 is configured to inhibit passage of water up to a water depth of approximately fifteen feet (five meters) for a duration of approximately fifteen minutes.

To further prevent entry of liquid into the processing unit 702, in one exemplary embodiment, the housing 906 may be water resistant, and the communication ports 908 may be sealed about the communication cable 708 and release cable 710 with, for example, sealed plug connections and/or an adhesive material (not shown). The sealed plug connections may seal about the housing 906 with the plugs formed of elastomeric material that may serve as gaskets between the different components, such as between the housing 906 and the communication cables 708. The plug connections may be O-rings, configured to seal any entrances and exits of the cables. Other methods of sealing the casing may be used as is known in the art.

As stated above, the control unit 700, described with reference to FIG. 8A may also be water resistant. It should be noted that additional components, such as the cutter and connectors associated with the release unit and described below, may also be sealed and protected from water, thereby ensuring a water resistant AAD.

After water contact, the rig 600 (FIG. 6) and the reserve parachute must be dried, and the filter may be replaced, as described below. An exemplary method for removing the filter 902 from the AAD 610 is described with reference to FIG. 9D. In one embodiment, a filter changer 904 made of stainless steel (not shown), may help remove the filter 902. The filter changer may be hollow cylinder configured to fit about the circumference 914 of the filter 902. The filter changer may include a slotted end and a non-slotted end, each configured to receive the filter 902.

The method to remove the filter 902 from the housing 906 begins at a step 930. At a step 932, a user may hold the filter changer and push it straight (without tilting) onto the filter 902 up to a stop position. The user may twist off the filter 902 by turning in a counter-clockwise direction, and then remove the filter 902, at a step 934. If there is water in the casing behind filter 902, the user may absorb the water with a cloth, at a step 936. The user may remove the old filter 902 from the filter changer by applying a pushing force through the hollow cylinder, such as by pushing with the eraser end of a pencil, at a step 938. The method ends at a step 940.

Figure 9E:
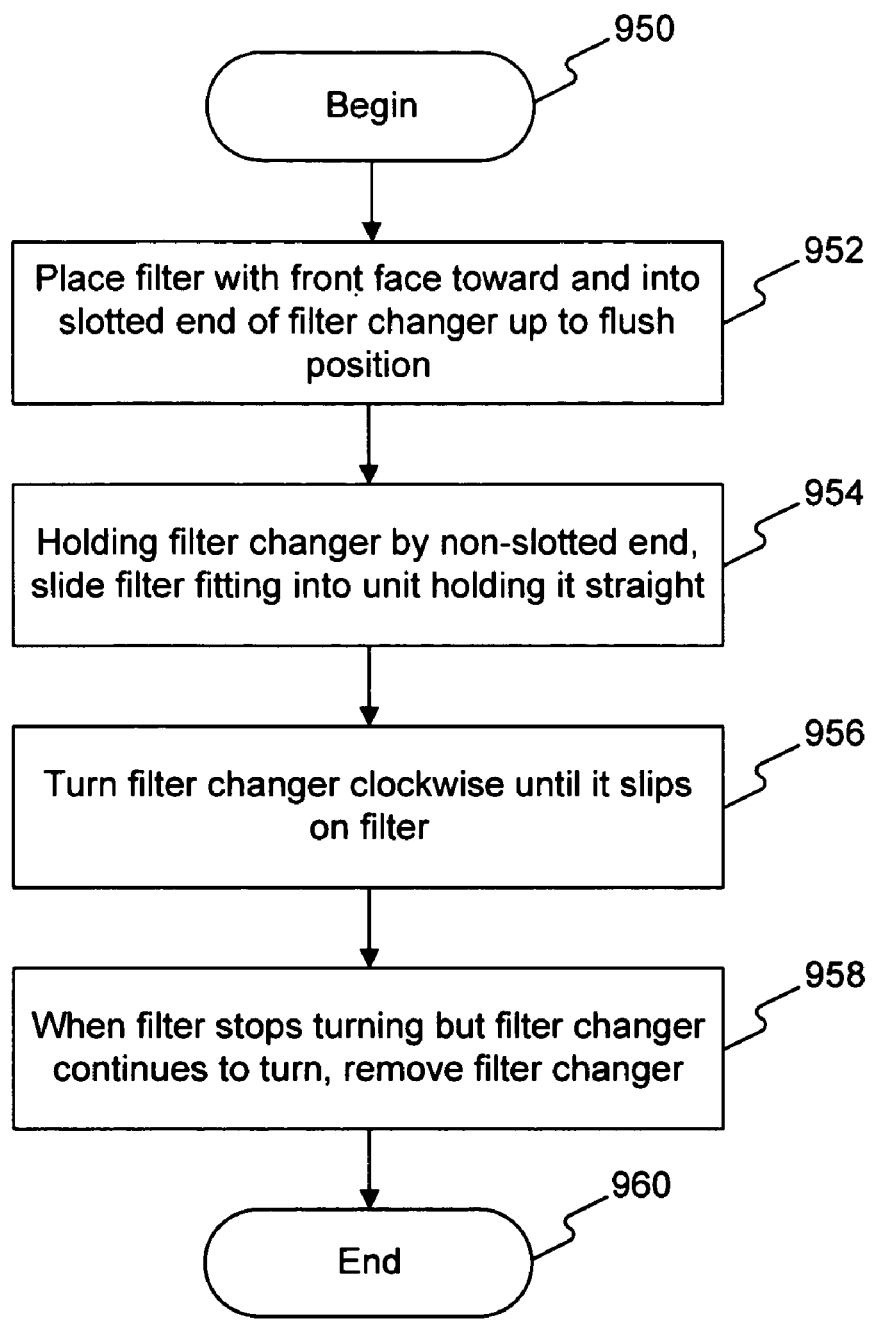
FIG. 9E is a flow diagram of exemplary steps performed to replace a filter in an AAD according to an implementation of the present invention.

One exemplary method for installing a new filter 902 is described with reference to FIG. 9E. The method of installing the new filter 902 may begin at a step 950. At a step 952, a user may place a new filter 914 with the front face 912 toward and into a slotted end of the filter changer up to a flush position. Without angling the filter changer, the user may gently slide the luer fitting 916 into the housing 906, holding it straight without tilting, at a step 954. The user may turn the filter changer clockwise noting that initially there may be little resistance. The user may continue turning the filter changer until it slips on filter 902 at a step 956. The filter 902 may stop turning but the filter changer may continue to turn. A user may remove the filter changer by pulling straight back, at a step 958. The method ends at a step 960.

Figure 10A:
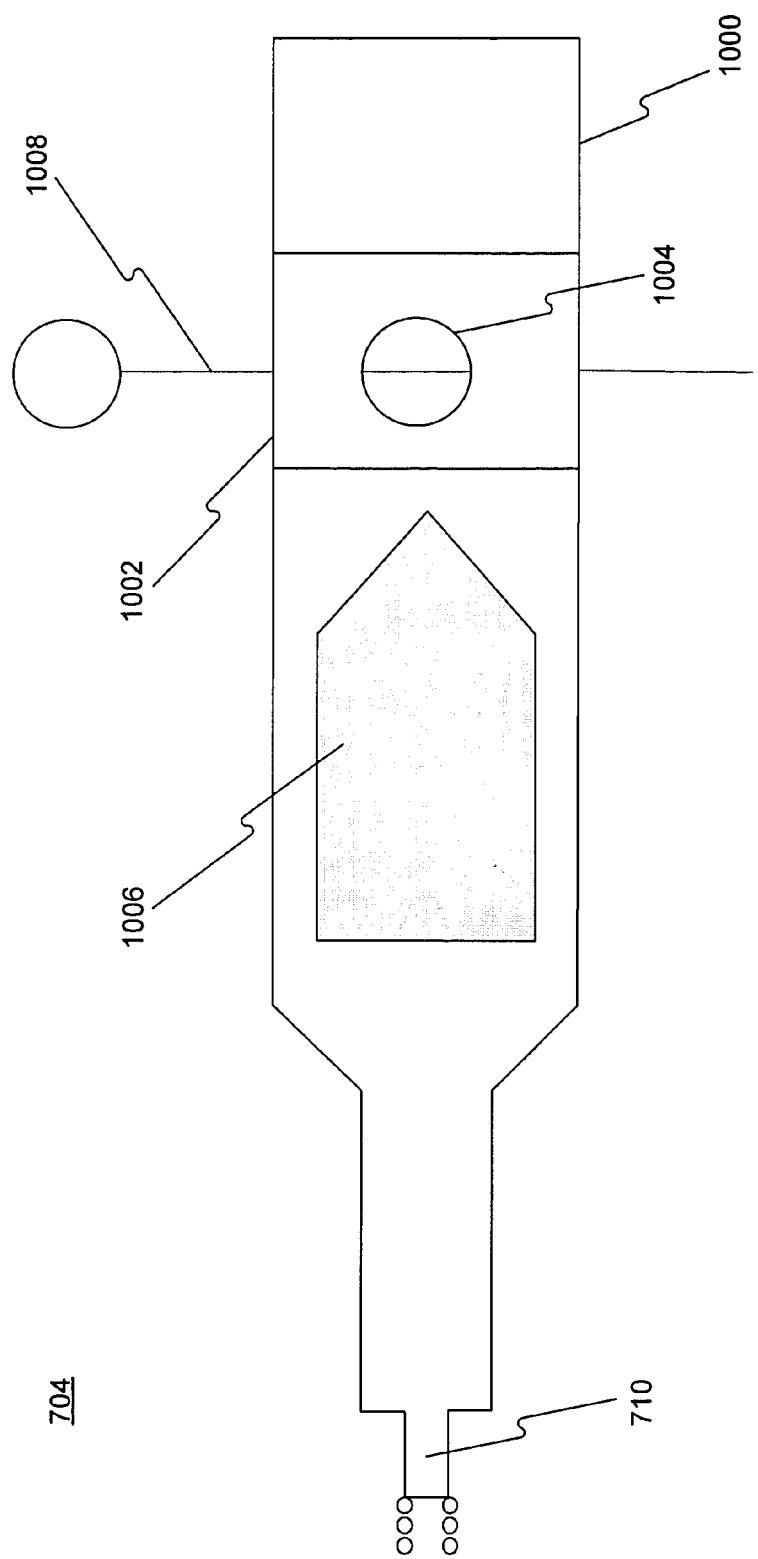
FIG. 10A is a diagram of an exemplary release unit according to an implementation of the present invention.

The release unit 704 from FIG. 7 is shown in greater detail and will be described with reference to FIG. 10A. The release unit 704 may include, among other things, a steel body 1000, a plastic guide 1002, a hole 1004, a blade 1006 and the rig's closing loop 1008. This release unit 704, or cutter system, is completely independent of the primary system of the rig 600 (FIG. 6) because it may not pull the ripcord pin out of the closing loop 1008, but rather may cut closing loop 1008 inside the reserve container to release the reserve chute.

The closing loop 1008 may be made of a flexible material, with a breaking strength of 450 pounds, and a diameter of 1/16 of an inch. In one embodiment, the closing loop 1008 may be thin, flexible and slippery loop that may reduce the possibility of the loop jamming in grommets. In one exemplary embodiment, the closing loop 1008 may be impregnated with silicon to reduce the pull force required to pull the ripcord, although the tension on the reserve container may remain the same. One exemplary AAD 610, such as a military unit, may include two release units 704 for a 2-pin reserve container.

In one exemplary embodiment, the release unit 704 includes an improved integrated water-resistant system featuring integrated sealed case and filter requiring no add-on case or treatment with silicon. In another exemplary embodiment, the release unit features an improved water-resistant means of opening a parachute container by cutting the container closing loop with the use of with a water-resistant sealed cutter.

The AAD 610 activation system may have one or more advantages over prior systems. For example, the reserve container may be opened in more than one way. For example, one way to open the reserve container is by the jumper pulling a reserve release handle. Another way to open the reserve container is by using release unit 704, which may cut the closing loop 1008. The mechanical components in the release unit 704 may be reduced to a single movable piston. The release unit 704 may be located inside the reserve container where it is not exposed to excessive shock or other adverse influences, and the unit 704 may be unobtrusive and can be installed so that it is undetectable from the outside. Further, the release unit 704 may be completely self-contained. In the event of activation, there is no exhaust gas or vapors that may escape or be expelled. After an activation, the release unit 704 can be changed by any rigger via a simple plug-and-socket connection.

The release unit 107 may be water resistant. Both one and two-pin cutter versions may include integrated seals that eliminate the need for external treatment of any sealing material, such as silicon, or other sealing methods, such as rubber sealing tubes, by the parachute rigger. In one embodiment, integrated O-rings may be used to seal male to female connections within the release unit 704, as well as the release cable to connector portions and the release cable to the release unit body. Accordingly, the cutter may be replaced without disassembly of the main processing unit casing.

A typical cutter may include a plug and a socket (not shown). To assure that no unintentional activations occur, the shielding within the region of the cutter may be as powerful as the shielding in the solid cable. In one embodiment, the plug-and-socket connection provides this shielding. The plug and socket may be molded under extreme high pressure onto cable ends. One or more O-rings may seal the areas between the cable and the plug body and between the cable and socket body so that they are waterproof. In one exemplary embodiment, to stop water from entering between plug and socket, there may be a 5.5×1 mm O-ring placed on the inner surface of the male connector. The O-ring may be pressed to form a seal via an aluminum cap having a sloped interior at a given angle. In one embodiment, the connection can be made waterproof for depths of 15 feet, and for up to 15 minutes.

Figure 10B:
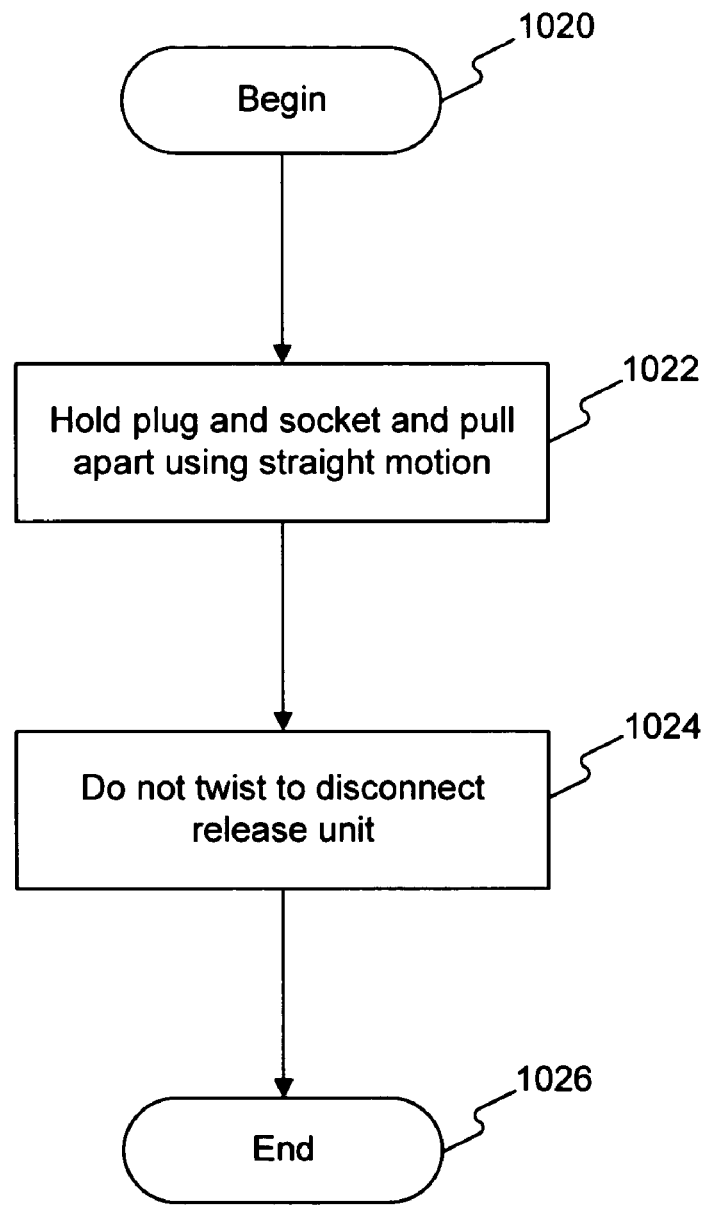
FIG. 10B is a flow diagram of exemplary steps performed to disconnect a release unit according to an implementation of the present invention.

One exemplary method of disconnecting the release unit 704 is described with reference to FIG. 10B. At a step 1020, the method begins. At a step 1022, a user may hold a plug and socket by and pull them apart using a smooth straight motion. This may be done without twisting, at a step 1024. The plug and socket may each be held by aluminum grips. The method ends at a step 1026.

Figure 10C:
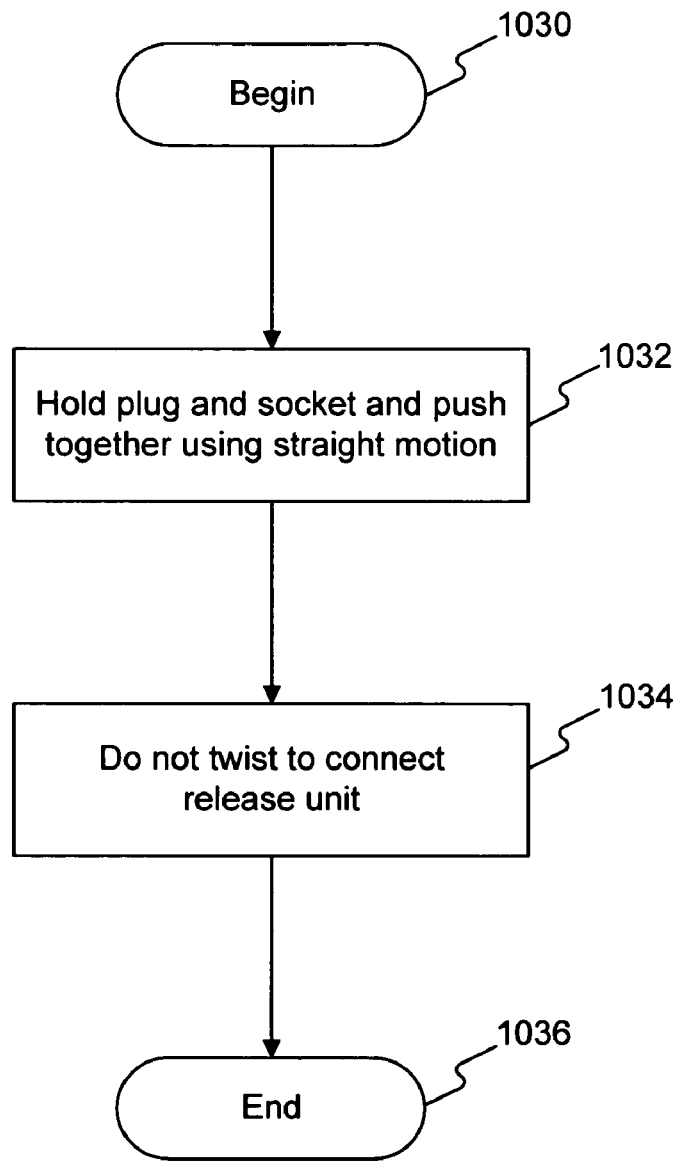
FIG. 10C is a flow diagram of exemplary steps performed to connect a release unit according to an implementation of the present invention.

One exemplary method of connecting the release unit 704 is described with reference to FIG. 10C. The method begins at a step 1030. At a step 1032, a user may hold the plug and socket and place the plug directly in front of the socket and connect them by pushing together with a smooth straight motion until it is completely seated. The user may push by holding aluminum grips on the socket and plug. The pushing may be accomplished without twisting, at a step 1034. The method ends at a step 1036.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of protecting an automatic activation device for deploying a parachute from damage from a liquid, comprising:
   securing a sensor in a housing of the automatic activation device;
   sealing the housing with at least one sealing material; and
   associating a filter with the housing, the filter being configured to allow airflow to pass through the filter into the housing and being configured to prevent passage of liquid through the filter into the housing.

2. The method of claim 1, wherein the sealing material is a sealing plug configured to seal about a communication cable associated with the housing.

3. The method of claim 1, wherein the sealing material is an O-ring associated with the housing.

4. The method of claim 1, wherein the sealing material is a gasket associated with the housing.

5. The method of claim 1, wherein the filter is removably secured to the housing.

6. The method of claim 1, wherein associating a filter includes threading the filter onto the housing.

7. The method of claim 1, further comprising replacing the filter after the automatic activation device contacts water.

8. The method of claim 1, wherein associating the filter includes securing the filter into a recess formed in the housing.

9. The method of claim 1, wherein the filter is configured to prevent water from flowing through the filter for at least five minutes when submerged at a depth less than fifteen feet.

10. The method of claim 1, wherein the filter is configured to prevent water from flowing through the filter for at least fifteen minutes when submerged at a depth of about fifteen feet.

11. The method of claim 1, wherein associating a filter with the housing includes attaching the filter to the housing using a luer lock.

12. The method of claim 1, including recessing the filter in the housing.

13. A system for deploying a parachute at a desired altitude with an automatic activation device, comprising:
a sensor secured in a housing of the automatic activation device;
a housing sealed with at least one sealing material, the sensor disposed within the housing; and
a filter associated with the housing, the filter being configured to allow airflow to pass through the filter into the housing and being configured to prevent passage of liquid through the filter into the housing.

14. The system of claim 13, comprising a communication cable associated with the housing, wherein the sealing material is a sealing plug configured to seal about the communication cable.

15. The system of claim 13, wherein the filter is removably secured to the housing.

16. The system of claim 13, wherein the filter is threaded onto the housing.

17. The system of claim 13, wherein the housing includes a recess, the filter being secured in the recess.

18. The system of claim 13, wherein the filter is configured to prevent water from flowing through the filter for at least fifteen minutes when submerged at a depth of about fifteen feet.

19. The system of claim 13, wherein the filter includes a luer lock configured to attach the filter to the housing.

20. A system for deploying a parachute at a desired altitude with an automatic activation device, comprising:
sensing means in a housing of the automatic activation device;
means for sealing the housing; and
means for allowing airflow to pass into the housing and preventing passage of liquid into the housing.

21. The system of claim 20, wherein the means for sealing is a sealing plug configured to seal about a communication cable associated with the housing.

22. The system of claim 20, wherein the means for sealing is an O-ring associated with the housing.

23. The system of claim 20, wherein the means for sealing is a gasket associated with the housing.

24. The system of claim 20, wherein the filter is removably secured to the housing.

25. The system of claim 20, wherein the means for allowing airflow and preventing passage of liquid is configured to prevent water from flowing into the housing for at least fifteen minutes when submerged at a depth of about fifteen feet.

26. The system of claim 20, wherein the means for allowing airflow and preventing passage of liquid is connected to the housing using a luer lock.

27. A method of deploying a parachute at a desired altitude with an automatic activation device, comprising:
allowing air to flow through a filter to enter the automatic activation device so that an air pressure in the automatic activation device substantially corresponds to an air pressure outside the automatic activation device, wherein the filter is configured to prevent liquid from flowing through the filter and entering the automatic activation device;
monitoring the air pressure with a sensor disposed within the automatic activation device; and
triggering a release mechanism when the monitored air pressure substantially corresponds to an air pressure at the desired altitude to deploy the parachute.

28. The method of claim 27, wherein the filter is configured to prevent water from flowing through the filter for at least five minutes when submerged at a depth less than fifteen feet.

29. The method of claim 27, wherein the filter is configured to prevent water from flowing through the filter for at least fifteen minutes when submerged at a depth of about fifteen feet.

30. The method of claim 27, further comprising attaching the filter to the automatic activation device using a threaded connection.

31. The method of claim 27, further comprising replacing the filter after the automatic activation device contacts water.

32. The method of claim 27, further comprising calculating a rate of descent using the monitored air pressure.

33. The method of claim 27, further comprising calculating a height above ground level using the monitored air pressure.

34. The method of claim 27, further comprising advancing a blade to cut a closing loop and open a container containing the parachute.

35. The method of claim 27, further comprising communicating a signal representative of the monitored air pressure from the sensor to a processor.

36. The method of claim 35, including communicating a triggering signal from the processor to a release unit configured to deploy the parachute.

37. The method of claim 27, comprising associating the filter with a housing of the automatic activation device using a luer lock.

38. The method of claim 37, including recessing the filter in a recess in the housing.

39. A system for deploying a parachute at a desired altitude with an automatic activation device, comprising:
a filter configured to allow air to flow through the filter to enter the automatic activation device so that an air pressure in the automatic activation device substantially corresponds to an air pressure outside the automatic activation device, wherein the filter is also configured to prevent liquid from flowing through the filter and entering the automatic activation device;
a sensor disposed in an interior of the automatic activation device, the sensor being configured to monitor air pressure within the automatic activation device; and
a release mechanism configured to trigger when the monitored air pressure substantially corresponds to an air pressure at the desired altitude to deploy the parachute.

40. The system of claim 39, further comprising a processor configured to calculate an altitude above ground level using the monitored air pressure.

41. The system of claim 39, further comprising a cutting mechanism configured to cut a loop associated with a rig containing the parachute.

42. The system of claim 39, wherein the filter is configured to prevent water from flowing through the filter for at least five minutes when submerged at a depth less than fifteen feet.

43. The system of claim 39, wherein the filter is configured to prevent water from flowing through the filter for at least fifteen minutes when submerged at a depth of about fifteen feet.

44. The system of claim 39, comprising a housing, wherein the filter is removably connected to the housing using a luer lock.

45. The system of claim 44, wherein the housing includes a recess formed in an outer surface, the filter being disposed within the recess.

46. An automatic activation device for deploying a parachute at a desired altitude, comprising:

means for allowing air to enter the automatic activation device so that an air pressure in the automatic activation device substantially corresponds to an air pressure outside the automatic activation device, the means for allowing air being configured to prevent liquid from entering the automatic activation device; and means for monitoring the air pressure within the automatic activation device;

means for triggering a release mechanism when the monitored air pressure substantially corresponds to an air pressure at the desired altitude to deploy the parachute.

47. The automatic activation device of claim 46, further comprising a means for processing configured to calculate an altitude above ground level using the monitored air pressure.

48. The automatic activation device of claim 46, further comprising a cutting mechanism configured to cut a loop associated with a rig containing the parachute.

49. The automatic activation device of claim 46, wherein means for allowing air is a filter configured to prevent water from flowing through the filter for at least five minutes when submerged at a depth less than fifteen feet.

50. The automatic activation device of claim 46, wherein the means for allowing air is a filter configured to prevent water from flowing through the filter for at least fifteen minutes when submerged at a depth of about fifteen feet.

51. The automatic activation device of claim 46, comprising a housing, wherein the means for allowing air is removably connected to the housing using a luer lock.

52. The automatic activation device of claim 51, wherein the housing includes a recess formed in an outer surface, the means for allowing air being disposed within the recess.

53. A system for deploying a parachute at a desired altitude with an automatic activation device, comprising:

a sensor secured in a housing of the automatic activation device;

a housing sealed with at least one sealing material, the sensor disposed within the housing; and a filter associated with the housing, the filter having a first and a second membrane disposed within a filter housing, at least one of the first and second membranes being configured to allow airflow to pass through the filter into the housing and being configured to prevent passage of liquid through the filter into the housing.

54. The system of claim 53, wherein the filter includes a front face and a back face, with the front face being permeable to air and water.

55. The system of claim 54, wherein the front face of the filter may be impermeable to air.

56. The system of claim 53, wherein the front face of the filter may be impermeable to water for up to fifteen minutes at a depth less than 15 feet.

\* \* \* \* \*